US010287502B2

(12) United States Patent
Kurisawa et al.

(10) Patent No.: US 10,287,502 B2
(45) **Date of Patent: *May 14, 2019**

(54) LIQUID CRYSTAL COMPOSITION CONTAINING POLYMERIZABLE COMPOUND AND LIQUID CRYSTAL DISPLAY ELEMENT USING THE SAME

(71) Applicant: DIC CORPORATION, Tokyo (JP)

(72) Inventors: Kazuki Kurisawa, Kitaadachi-gun (JP); Takeshi Kuriyama, Kitaadachi-gun (JP); Shotaro Kawakami, Saitama (JP)

(73) Assignee: DIC CORPORATION (TOKYO), Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,905

(22) Filed: May 10, 2016

(65) Prior Publication Data

US 2016/0251576 A1 Sep. 1, 2016

Related U.S. Application Data

(63) Continuation of application No. 14/238,153, filed as application No. PCT/JP2012/070482 on Aug. 10, 2012, now Pat. No. 10,011,771.

(30) Foreign Application Priority Data

Aug. 11, 2011 (JP) ................................ 2011-175909

(51) Int. Cl.

| | |
|---|---|
| ***C09K 19/20*** | (2006.01) |
| ***C09K 19/54*** | (2006.01) |
| ***C09K 19/12*** | (2006.01) |
| ***C09K 19/34*** | (2006.01) |
| ***C09K 19/32*** | (2006.01) |
| ***C09K 19/30*** | (2006.01) |
| ***C09K 19/56*** | (2006.01) |
| ***G02F 1/1337*** | (2006.01) |
| ***C09K 19/10*** | (2006.01) |
| ***G02F 1/1333*** | (2006.01) |
| ***G02F 1/1335*** | (2006.01) |
| ***G02F 1/1341*** | (2006.01) |
| *C09K 19/04* | (2006.01) |

(52) U.S. Cl.

CPC ............ *C09K 19/542* (2013.01); *C09K 19/10* (2013.01); *C09K 19/12* (2013.01); *C09K 19/20* (2013.01); *C09K 19/3003* (2013.01); *C09K 19/3028* (2013.01); *C09K 19/3066* (2013.01); *C09K 19/322* (2013.01); *C09K 19/3402* (2013.01); *C09K 19/3483* (2013.01); *C09K 19/56* (2013.01); *G02F 1/1341* (2013.01); *G02F 1/133365* (2013.01); *G02F 1/133528* (2013.01); *G02F 1/133703* (2013.01); *G02F 1/133723* (2013.01); *G02F 1/133788* (2013.01); *C09K 19/3411* (2013.01); *C09K 2019/0448* (2013.01); *C09K 2019/121* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3036* (2013.01); *C09K 2019/3037* (2013.01); *C09K 2019/325* (2013.01); *C09K 2019/3416* (2013.01); *C09K 2019/3425* (2013.01); *C09K 2019/548* (2013.01); *G02F 1/133753* (2013.01); *G02F 2001/133397* (2013.01); *G02F 2001/133742* (2013.01); *G02F 2001/133746* (2013.01); *G02F 2001/133749* (2013.01); *G02F 2202/022* (2013.01)

(58) Field of Classification Search

CPC ..................................................... C09K 19/12

See application file for complete search history.

(56) References Cited

U.S. PATENT DOCUMENTS 5,560,864 A 10/1996 Goulding
2004/0011996 A1 1/2004 Klasen-Memmer et al.
(Continued)

FOREIGN PATENT DOCUMENTS

CN 1475547 A 2/2004
CN 101790573 A 7/2010
(Continued)

OTHER PUBLICATIONS

Extended European Search Report dated Apr. 2, 2015, issued in corresponding European Application No. 12822114.0 (7 pages).
(Continued)

*Primary Examiner* — Chanceity N Robinson
(74) *Attorney, Agent, or Firm* — Westerman, Hattori, Daniels & Adrian, LLP

(57) ABSTRACT

A liquid crystal composition containing a polymerizable compound of the present invention has excellent characteristics of being able to prepare a PSA type liquid crystal display element with no problem of depositing in a wide temperature range, having high polymerization speed, high liquid crystal alignment regulation force after polymerization, excellent display qualities with no display unevenness, and excellent display characteristics with no defects in display characteristics such as image sticking and is appropriate as a liquid crystal composition in a practical use. Further, the liquid crystal display element with the above-described liquid crystal composition can be appropriately used for a PSA type liquid crystal display element.

12 Claims, No Drawings

(56) References Cited

U.S. PATENT DOCUMENTS

| | | | | |
|---|---|---|---|---|
| 2010/0272925 | A1* | 10/2010 | Goetz | C09K 19/12 428/1.1 |
| 2010/0309423 | A1 | 12/2010 | Bematz et al. | |
| 2011/0032468 | A1 | 2/2011 | Saito | |
| 2011/0095229 | A1 | 4/2011 | Lee et al. | |
| 2011/0272631 | A1 | 11/2011 | Saito | |
| 2012/0032112 | A1* | 2/2012 | Czanta | C09K 19/42 252/299.64 |
| 2012/0097895 | A1 | 4/2012 | Kuriyama et al. | |
| 2012/0182516 | A1* | 7/2012 | Taugerbeck | C09K 19/0403 349/183 |
| 2012/0224124 | A1 | 9/2012 | Goetz et al. | |
| 2012/0292568 | A1 | 11/2012 | Kuriyama et al. | |
| 2013/0114010 | A1 | 5/2013 | Goetz et al. | |
| 2013/0335651 | A1 | 12/2013 | Lee et al. | |
| 2013/0335652 | A1 | 12/2013 | Lee et al. | |
| 2013/0335653 | A1 | 12/2013 | Lee et al. | |

FOREIGN PATENT DOCUMENTS

| | | | |
|---|---|---|---|
| CN | 101981156 | A | 2/2011 |
| CN | 102076821 | A | 5/2011 |
| CN | 102786937 | A | 11/2012 |
| CN | 103025773 | A | 4/2013 |
| EP | 0591508 | B1 | 7/1999 |
| JP | 07-258638 | A | 10/1995 |
| JP | 2003-519244 | A | 6/2003 |
| JP | 2003-307720 | A | 10/2003 |
| JP | 2004-302096 | A | 10/2004 |
| JP | 2007-169363 | A | 7/2007 |
| JP | 2008-63337 | A | 3/2008 |
| JP | 2008-116931 | A | 5/2008 |
| JP | 2010-90277 | A | 4/2010 |
| JP | 2010-256904 | A | 11/2010 |
| JP | 2010-285499 | A | 12/2010 |
| WO | 2009/104468 | A1 | 8/2009 |
| WO | 2010/084823 | A1 | 7/2010 |
| WO | 2010/089092 | A1 | 8/2010 |
| WO | 2010/119779 | A1 | 10/2010 |
| WO | 2011035842 | A1 | 3/2011 |
| WO | 2011050893 | A1 | 5/2011 |

OTHER PUBLICATIONS

International Search Report dated Sep. 11, 2012, issued in corresponding application No. PCT/JP2012/070482 (2 pages).
Non-Final Office Action dated Jun. 3, 2016, issued in U.S. Appl. No. 14/238,153. (16 Pages).
Final Office Action dated Jan. 26, 2017, issued in U.S. Appl. No. 14/238,153. (18 pages).

* cited by examiner

LIQUID CRYSTAL COMPOSITION CONTAINING POLYMERIZABLE COMPOUND AND LIQUID CRYSTAL DISPLAY ELEMENT USING THE SAME

CROSS-REFERENCE TO RELATED APPLICATIONS

This application is a continuation of U.S. application Ser. No. 14/238,153, filed on Feb. 10, 2014, and wherein U.S. application Ser. No. 14/238,153 is a national stage application filed under 35 U.S.C. § 371 of International Application No. PCT/JP2012/070482, filed Aug. 10, 2012, which is based upon and claims the benefit of priority of the prior Japanese Patent Application No. 2011-175909, filed on Aug. 11, 2011, the entire contents of which are incorporated herein by reference.

TECHNICAL FIELD

The present invention relates to a liquid crystal composition containing a polymerizable composition and a liquid crystal display element using the liquid crystal composition.

BACKGROUND ART

A PSA (Polymer Sustained Alignment) type liquid crystal display element has a structure with a polymer structure formed in a cell in order to control a pretilt angle of a liquid crystal molecule, and has been practically used as a liquid crystal display element due to high speed responsiveness and high contrast.

Production of a PSA type liquid crystal display element is performed by injecting a polymerizable composition containing a liquid crystal compound and a polymerizable compound between substrates, and polymerizing the polymerizable compound to fix the alignment of liquid crystal molecules in a state of applying a voltage to the polymerizable composition and aligning the liquid crystal molecules. As the cause of image sticking which is a display defect of the PSA type liquid crystal display element, impurities and change in alignment of the liquid crystal molecules are known (change in pretilt angle).

In the image sticking due to the change in the pretilt angle of liquid crystal molecules, the change in the pretilt angle is a result of change in the structure of a polymer when the same pattern is repetitively displayed for a long period of time as the case of constituting the display element. Therefore, a polymerizable compound forming a polymer having a rigid structure with no change in the polymer structure is required.

In the related art, in order to prevent the image sticking by improving the rigidity of a polymer, configuring a display element using a polymerizable compound which includes a structure such as a 1,4-phenylene group composed only of a ring structure and a polymerizable functional group and configuring a display element using a polymerizable compound having a biaryl structure (Patent Documents 1 to 4) have been considered. However, since the polymerizable compounds have low compatibility with respect to a liquid crystal compound, deposition of the polymerizable compound occurs when a liquid crystal composition is prepared, therefore, improvement thereof is required.

Further, when a biaryl-based polymerizable compound is polymerized using UV irradiation, for example, the reaction speed is low, so UV irradiation time is needed to be longer. However, when the UV irradiation time becomes longer, decomposition or the like of the liquid crystal composition occurs, and this leads to degradation in reliability.

As described above, it is difficult to satisfy characteristics, which are required in a polymerizable-compound-containing liquid crystal composition, such as image sticking of a display element, alignment stability, stability as a liquid crystal composition with no deposition occurring, a display characteristic, and manufacturing efficiency when a PSA type liquid crystal display element is prepared, therefore, further improvement is required.

CITATION LIST

Patent Literature

[PTL 1] Japanese Unexamined Patent Application, First Publication No. 2003-307720

[PTL 2] Japanese Unexamined Patent Application, First Publication No. 2008-116931

[PTL 3] Japanese Unexamined Patent Application, First Publication No. 2004-302096

[PTL 4] WO2010/084823

SUMMARY OF INVENTION

Technical Problem

An object of the present invention is to provide a polymerizable-compound-containing liquid crystal composition with no deposition in a wide temperature range, high polymerization speed, high liquid crystal alignment regulation force after polymerization, and no defects in display characteristics such as image sticking. Further, the object is to provide a PSA type liquid crystal display element having excellent display characteristics and excellent display qualities with no display unevenness by using the polymerizable-compound-containing liquid crystal composition.

Solution to Problem

As a result of investigation of various polymerizable compounds and non-polymerizable liquid crystal materials by the present inventors, they found that a liquid crystal composition containing a polymerizable compound formed of a polymerizable compound and a non-polymerizable liquid crystal material with a specific structure can solve the above-described problem, thereby completing the present invention.

That is, the present invention provides a polymerizable-compound-containing liquid crystal composition, containing as a first component, one or two or more kinds of polymerizable compounds represented by general formula (I):

[Chem. 1]

(I)

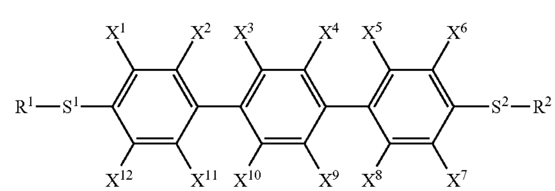

(in the formula, $R^1$ and $R^2$ each independently represent any one of the following formulae (R-1) to (R-15), $S^1$ and $S^2$ each independently represent an alkylene group having 1 to 12 carbon atoms or a single bond, a methylene group in the alkylene group may be substituted with an oxygen atom, a sulfur atom, —CO—, —COO—, —OCO—, —OCOO—, —CH═CH— or —C≡C— as long as oxygen atoms are not directly bonded to each other, provided that at least one of $S^1$ and $S^2$ is not a single bond, and $X^1$ to $X^{12}$ each independently represent a hydrogen atom, a trifluoromethyl group, a trifluoromethoxy group, a methyl group, a chlorine atom, or a fluorine atom),

[Chem. 2]

(R-1)

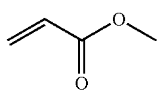

(R-2)

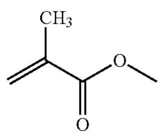

(R-3)

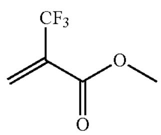

(R-4)

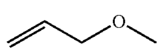

(R-5)

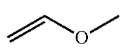

(R-6)

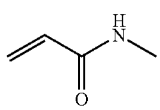

(R-7)

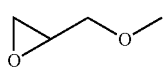

(R-8)

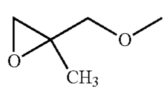

(R-9)

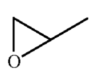

(R-10)

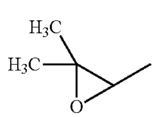

(R-11)

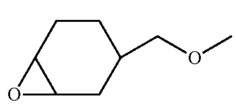

(R-12)

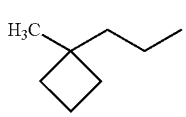

(R-13)

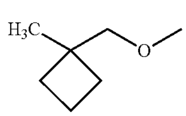

-continued (R-14)

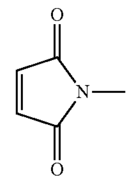

(R-15)

HS— as a second component, one or two or more kinds of compounds represented by general formula (II):

[Chem. 3]

$$R^{21}\text{-}M^{21}\text{-}L^{21}\text{-}M^{22}\text{-}(L^{22}\text{-}M^{23})_o\text{-}R^{22} \quad \text{(II)}$$

(in the formula, $R^{21}$ and $R^{22}$ each independently represent an alkyl group having 1 to 10 carbon atoms or an alkenyl group having 2 to 10 carbon atoms, one methylene group or two or more non-adjacent methylene groups present in these groups may be substituted with —O— or —S—, and one or two or more hydrogen atoms present in these groups may be substituted with a fluorine atom or a chlorine atom, $M^{21}$, $M^{22}$, and $M^{23}$ each independently represent a group selected from the group consisting of (a) a trans-1,4-cyclohexylene group (one methylene group or two or more non-adjacent methylene groups present in the group may be substituted with —O— or —S—), (b) a 1,4-phenylene group (one —CH═ or two or more non-adjacent (—CH═)'s present in the group may be substituted with a nitrogen atom), a 3-fluoro-1,4-phenylene group, a 3,5-difluoro-1,4-phenylene group, and (c) a 1,4-cyclohexenylene group, a 1,4-bicyclo[2,2,2]octylene group, a piperidine-2,5-diyl group, a naphthalene-2,6-diyl group, a decahydronaphthalene-2,6-diyl group, and a 1,2,3,4-tetrahydronaphthalene-2,6-diyl group, o represents 0, 1, or 2, and $L^{21}$ and $L^{22}$ each independently represent a single bond, $—CH_2CH_2—$, $—(CH_2)_4—$, $—OCH_2—$, $—CH_2O—$, $—OCF_2—$, $—CF_2O—$, —CH═CH—, —CH═N—N═CH—, or —C≡C—, and when a plurality of $L^{22}$'s and/or $M^{23}$'s are present, they may be the same as or different from each other), and as a third component, one or two or more kinds of a compound selected from the group consisting of compounds represented by general formulae (IIIa), (IIIb), and (IIIc):

[Chem. 4]

(IIIa)

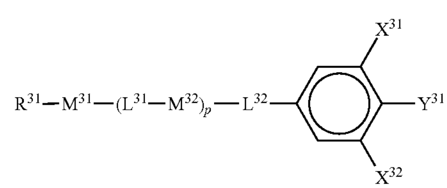

(IIIb)

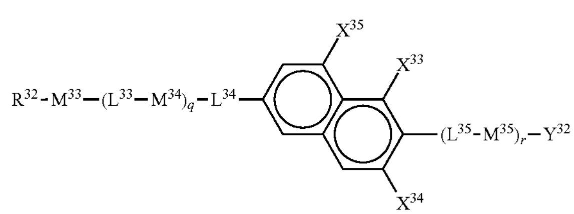

-continued (IIIc)

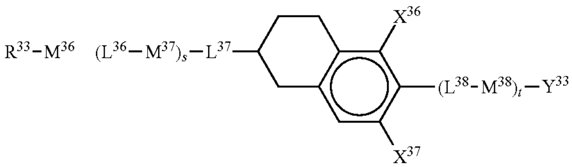

(in the formula, $R^{31}$, $R^{32}$, and R each independently represent an alkyl group having 1 to 10 carbon atoms or an alkenyl group having 2 to 10 carbon atoms, one methylene group or two or more non-adjacent methylene groups present in these groups may be substituted with —O— or —S—, and one or two or more of hydrogen atoms present in these groups may be substituted with a fluorine atom or a chlorine atom, $M^{31}$, $M^{32}$, $M^{33}$, $M^{34}$, $M^{35}$, $M^{36}$, $M^{37}$, and $M^{38}$ each independently represent a group selected from the group consisting of (d) a trans-1,4-cyclohexylene group (one methylene group or two or more non-adjacent methylene groups present in the group may be substituted with —O— or —S—), (e) a 1,4-phenylene group (one —CH═ or two or more non-adjacent (—CH═)'s present in the group may be substituted with a nitrogen atom), a 3-fluoro-1,4-phenylene group, a 3,5-difluoro-1,4-phenylene group, and (f) a 1,4-cyclohexenylene group, a 1,4-bicyclo[2,2,2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, and a hydrogen atom contained in the groups (d), (e), and (f) may be substituted with a cyano group, a fluorine atom, a trifluoromethyl group, a trifluoromethoxy group, or a chlorine atom, $L^{31}$, $L^{32}$, $L^{33}$, $L^{34}$, $L^{35}$, $L^{36}$, $L^{37}$, and $L^{38}$ each independently represent a single bond, —COO—, —OCO—, —$CH_2CH_2$—, —$(CH_2)_4$—, —$OCH_2$—, —$CH_2O$—, —$OCF_2$—, —$CF_2O$—, or —C≡C—, and when a plurality of $M^{32}$, $M^{34}$, $M^{35}$, $M^{37}$, $M^{38}$, $L^{31}$, $L^{33}$, $L^{35}$, $L^{36}$, and/or $L^{38}$ are present, they may be the same as or different from each other, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ each independently represent a hydrogen atom, a fluorine atom, a chlorine atom, a cyano group, a thiocyanate group, a trifluoromethoxy group, a trifluoromethyl group, a 2,2,2-trifluoroethyl group, or a difluoromethoxy group, at least one of $X^{31}$, $X^{32}$, and $Y^{31}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one of a hydrogen atom contained in $M^{31}$ or $M^{32}$ represents a cyano group, a fluorine atom, a trifluoromethyl group, a trifluoromethoxy group, or a chlorine atom, at least one of $X^{33}$, $X^{34}$, $X^{35}$, and $Y^{32}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one of a hydrogen atom contained in $M^{33}$, $M^{34}$, and $M^{35}$ represents a cyano group, a fluorine atom, a trifluoromethyl group, a trifluoromethoxy group, or a chlorine atom, at least one of $X^{36}$, $X^{37}$, and $Y^{33}$ represents a fluorine atom, a chlorine atom, a cyano group, a thiocyanate group, a trifluoromethoxy group, a trifluoromethyl group, a 2,2,2-trifluoroethyl group, or a difluoromethoxy group, or at least one of a hydrogen atom contained in $M^{36}$, $M^{37}$, and $M^{38}$ represents a cyano group, a fluorine atom, a trifluoromethyl group, a trifluoromethoxy group, or a chlorine atom, p, q, r, s, and t each independently represent 0, 1, or 2, and each of q+r and s+t is 2 or less), or a compound selected from the group consisting of compounds represented by general formulae (IVa), (IVb), and (IVc):

[Chem. 5]

(IVa)

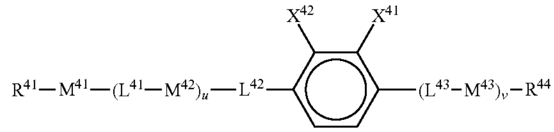

(IVb)

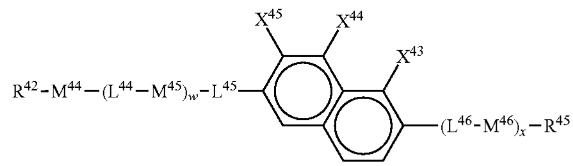

(IVc)

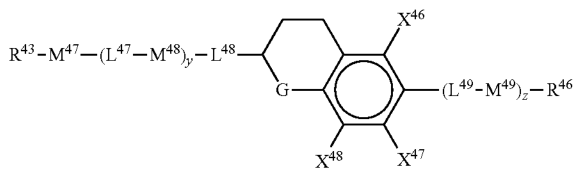

(in the formula, $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, and one methylene group or two or more non-adjacent methylene groups present in these groups may be substituted with —O— or —S—, and one or two or more of hydrogen atoms present in these groups may be substituted with a fluorine atom or a chloride atom, $M^{41}$, $M^{42}$, $M^{43}$, $M^{44}$, $M^{45}$, $M^{46}$, $M^{47}$, $M^{48}$, and $M^{49}$ each independently represent a group selected from the group consisting of (d) a trans-1,4-cyclohexylene group (one methylene group or two or more non-adjacent methylene groups present in the group may be substituted with —O— or —S—), (e) a 1,4-phenylene group (one —CH═ or two or more non-adjacent (—CH═)'s present in the group may be substituted with a nitrogen atom), and (f) a 1,4-cyclohexenylene group, a 1,4-bicyclo[2,2,2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, and a hydrogen atom contained in the groups (d), (e), and (f) may be substituted with a cyano group, a fluorine atom, a trifluoromethyl group, a trifluoromethoxy group, or a chlorine atom, $L^{41}$, $L^{42}$, $L^{43}$, $L^{44}$, $L^{45}$, $L^{46}$, $L^{47}$, $L^{48}$ and $L^{49}$ each independently represent a single bond, —COO—, —OCO—, —$CH_2CH_2$—, —$(CH_2)_4$—, —$OCH_2$—, —$CH_2O$—, —$OCF_2$—, —$CF_2O$—, or —C≡C—, and when a plurality of $M^{42}$, $M^{43}$, $M^{45}$, $M^{46}$, $M^{48}$, $M^{49}$, $L^{41}$, $L^{43}$, $L^{44}$, $L^{46}$, $L^{47}$ and/or $L^{49}$ are present, they may be the same as or different from each other, $X^{41}$, $X^{42}$, $X^{43}$, $X^{44}$, $X^{45}$, $X^{46}$, $X^{47}$, and $X^{48}$ each independently represent a hydrogen atom, a trifluoromethyl group, a trifluoromethoxy group, or a fluorine atom, any one of $X^{41}$ and $X^{42}$ represents a fluorine atom, any one of $X^{43}$, $X^{44}$, and $X^{45}$ represents a fluorine atom, any one of $X^{46}$, $X^{47}$, and $X^{48}$ represents a fluorine atom, provided that $X^{46}$ and $X^{47}$ do not represent a fluorine atom and $X^{46}$ and $X^{48}$ do not represent a fluorine atom at the same time, G represents a methylene group or —O—, and u, v, w, x, y, and z each independently represent 0, 1, or 2, and u+v, w+x, and y+z are each 2 or less) and further provides a liquid crystal display element using the liquid crystal composition.

Advantageous Effects of Invention

Since the polymerizable compound which is an indispensable component of the present invention has excellent compatibility with a non-polymerizable liquid crystal compound, it is possible to obtain a stabilized liquid crystal composition which maintains a nematic state even at a low temperature. The polymerizable compound represented by general formula (I) of the present invention shortens the polymerization time because the polymerizable compound has a polymerization speed faster than a biphenyl-based polymerizable compound, so negative influences due to the light or the like towards a non-polymerizable liquid crystal compound are widely reduced. Accordingly, display defects of a liquid crystal display element which applies alignment to a liquid crystal composition by polymerizing a polymerizable compound in the liquid crystal composition are widely reduced, and the yield at the time of production can be improved. Further, since a PSA type liquid crystal display element using the polymerizable liquid crystal composition of the present invention has a high response speed, the PSA type liquid crystal display element is effectively used as a liquid crystal composition of the liquid crystal display element.

DESCRIPTION OF EMBODIMENTS

A polymerizable compound used for a liquid crystal composition containing a polymerizable compound of the present invention is formed of compounds represented by general formula (I).

In general formula (I), $S^1$ and $S^2$ each independently represent an alkylene group or a single bond, but at least one of $S^1$ and $S^2$ is not a single bond. As an alkylene group, an alkylene group having 1 to 12 carbon atoms in which a methylene group may be substituted with an oxygen atom, a sulfur atom, —CO—, —COO—, —OCO—, —OCOO—, —CH═CH— or —C≡C— as long as oxygen atoms are not directly bonded to each other, is preferable, and an alkylene group having 2 to 12 carbon atoms in which a methylene group may be substituted with an oxygen atom, —COO—, —OCO—, or —OCOO— as long as oxygen atoms are not directly bonded to each other is more preferable.

$R^1$ and $R^2$ represent a polymerizable group. As specific examples, the following structures are exemplified.

[Chem. 8]

(R-1)

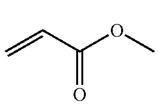

-continued (R-2)

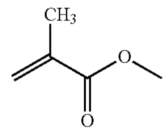

(R-3)

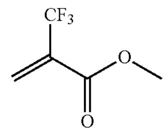

(R-4)

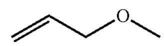

(R-5)

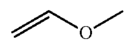

(R-6)

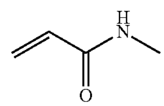

(R-7)

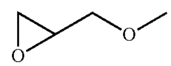

(R-8)

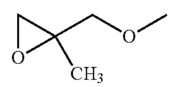

(R-9)

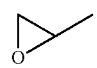

(R-10)

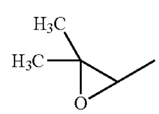

(R-11)

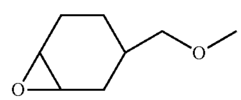

(R-12)

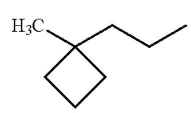

(R-13)

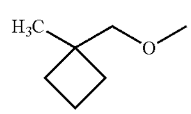

(R-14)

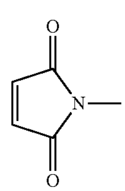

(R-15)

HS—

These polymerizable groups are cured by radical polymerization, radical addition polymerization, cation polymerization, and anion polymerization. In particular, in a case in which ultraviolet polymerization is performed as a polymerization method, formula (R-1), (R-2), (R-4), (R-5), (R-7), (R-11), (R-13), or (R-15) is preferable, formula (R-1), (R-2), (R-7), (R-11), or (R-13) is more preferable, and formula (R-1) or (R-2) is particularly preferable.

In general formula (I), $X^1$ to $X^{12}$ each independently represent a hydrogen atom, a trifluoromethyl group, a trifluoromethoxy group, a methyl group, a chlorine atom or a fluorine atom, and when the compatibility with a non-polymerizable liquid crystal compound is considered, at least one of $X^1$ to $X^{12}$ is preferably a trifluoromethyl group, a trifluoromethoxy group, a methyl group, or a fluorine atom, and at least one of $X^1$ to $X^{12}$ is preferably a methyl group or a fluorine atom. $X^1$, $X^6$, $X^7$, and $X^{12}$ are hydrogen atoms and at least one of $X^2$ to $X^5$ and $X^8$ to $X^{11}$ is preferably a methyl group or a fluorine atom.

Preferred examples of the polymerizable compound represented by general formula (I) are general formulae (I-1) to (I-40).

[Chem. 5]

(I-1)

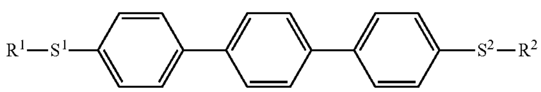

(I-2)

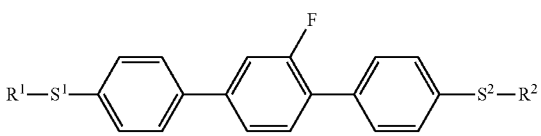

(I-3)

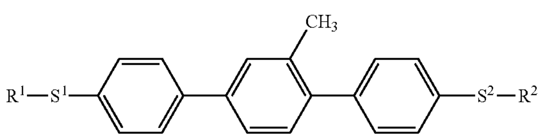

(I-4)

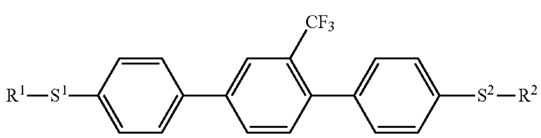

(I-5)

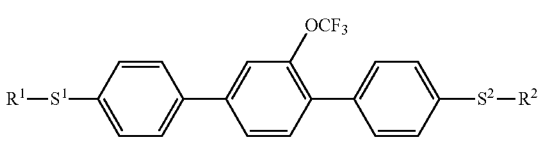

(I-6)

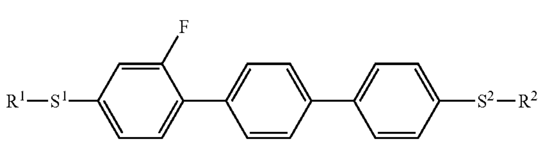

(I-7)

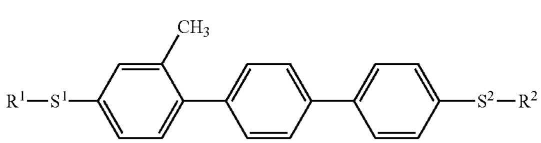

(I-8)

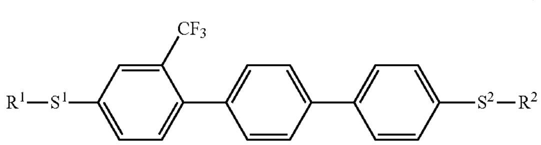

-continued (I-9)

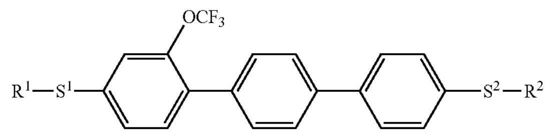

(I-10)

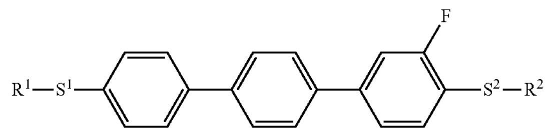

(I-11)

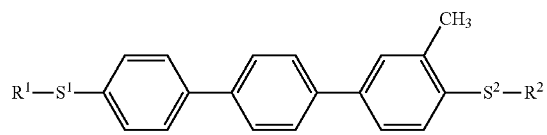

(I-12)

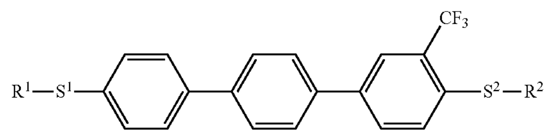

(I-13)

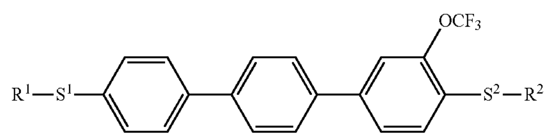

(I-14)

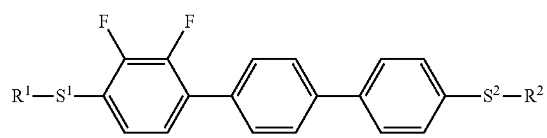

(I-15)

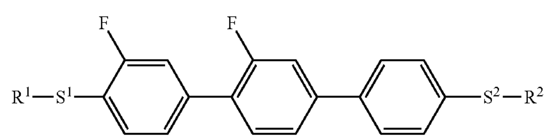

(I-16)

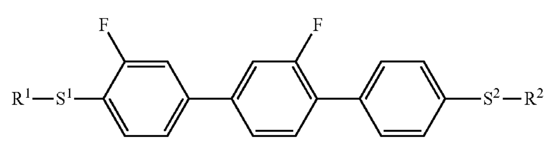

(I-17)

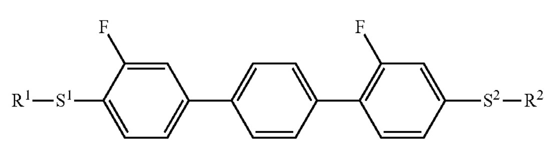

(I-18)

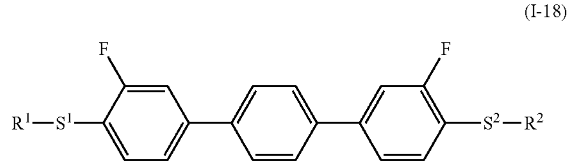

-continued
(I-19)
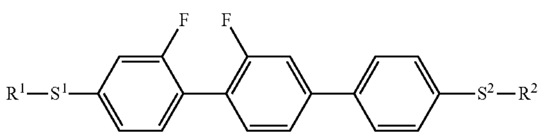
(I-20)
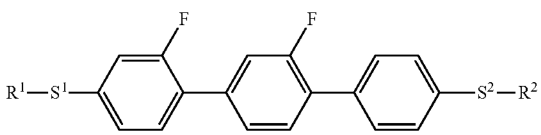
(I-21)
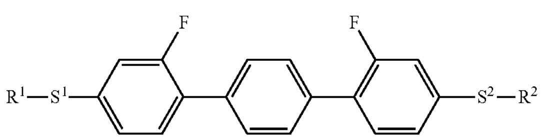
(I-22)
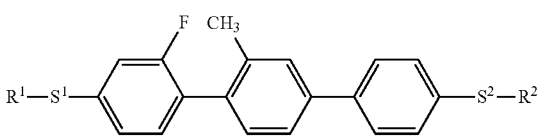
(I-23)
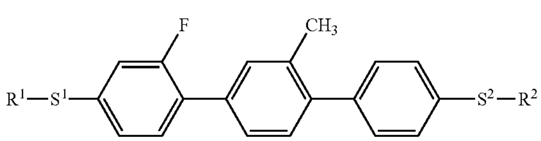
(I-24)
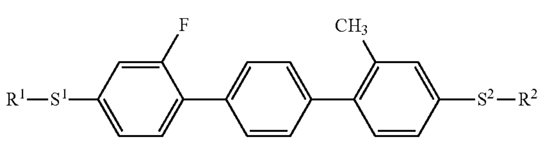
(I-25)
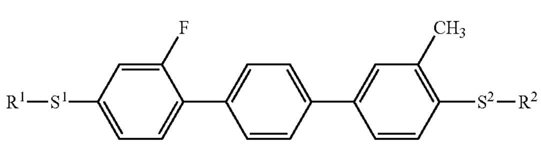
(I-26)
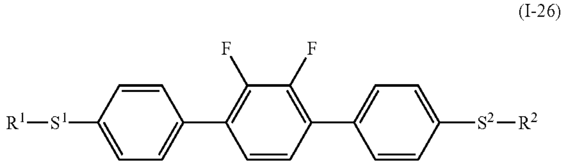
(I-27)
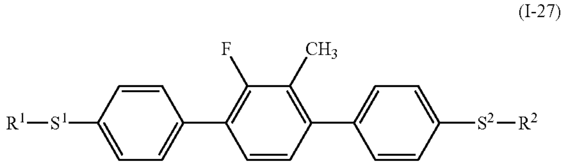
(I-28)
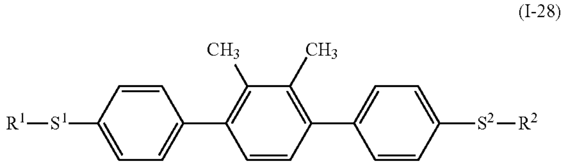
-continued
(I-29)
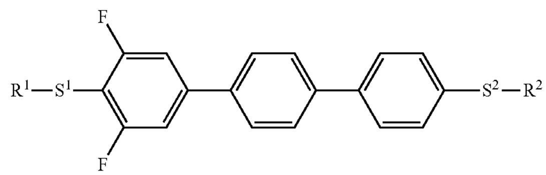
(I-30)
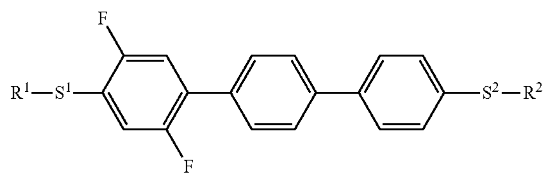
(I-31)
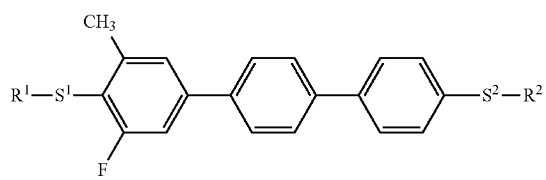
(I-32)
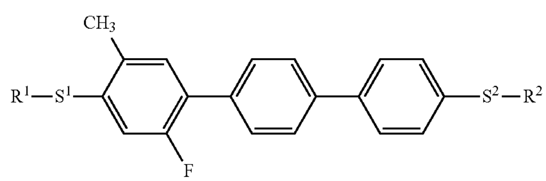
(I-33)
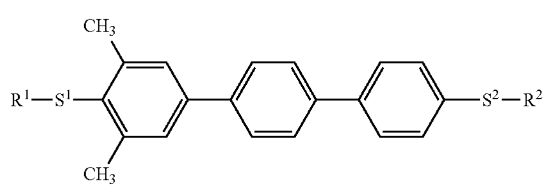
(I-34)
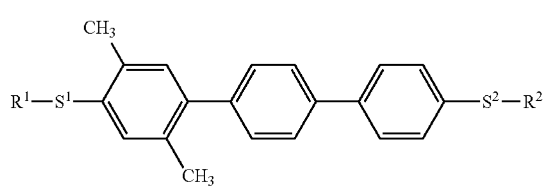
(I-35)
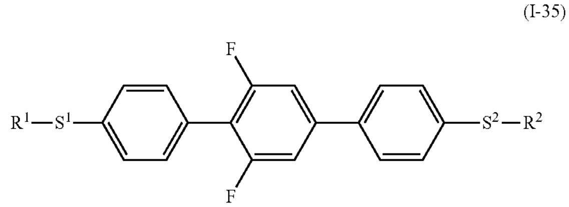
(I-36)
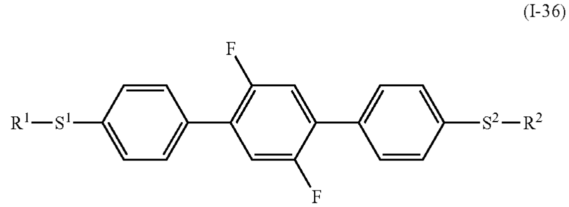

-continued (I-37)

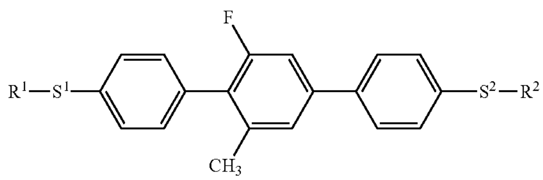

(I-38)

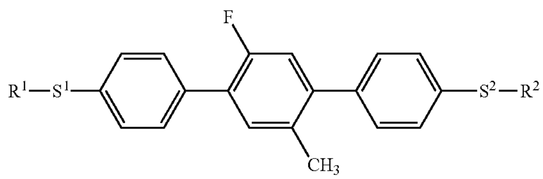

(I-39)

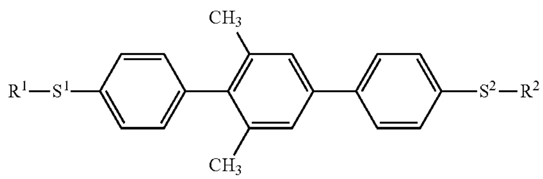

(I-40)

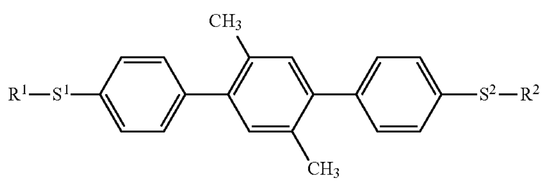

(In the formula, $R^1$, $R^2$, $S^1$, and $S^2$ represent the same definitions as those in general formula (I).)

Among the polymerizable compounds, the polymerizable compounds represented by general formulae (I-2), (I-3), (I-21), (I-26), and (I-36) are particularly preferable because they have excellent compatibility with a non-polymerizable liquid crystal compound, and a stabilized liquid crystal composition which maintains a nematic state even at a low temperature can be obtained. The polymerizable compounds containing skeletons represented by general formulae (I-2), (I-3), (I-21), (I-26), and (I-36) are preferable because the polymerization speed is high in the polymerizable liquid crystal compositions, the alignment regulation force is appropriate after polymerization, and the excellent alignment state of the liquid crystal composition is obtainable. In addition, since display defects, for example, change in liquid crystal molecules with respect to alignment, are caused by the low alignment regulation force, the polymerizable compounds represented by general formula (I-2) or (I-3) are particularly preferable in a case of attaching particular importance to the alignment regulation force.

The polymerizable-compound-containing liquid crystal composition of the present invention contains at least one kind of the polymerizable compound represented by general formula (I), but it is preferable to contain 1 to 5 kinds thereof and more preferable to contain 1 to 3 kinds thereof. In regard to the content of the compound represented by general formula (I), the lower limit thereof is preferably 0.01% by mass and more preferably 0.03% by mass and the upper limit thereof is preferably 2.0% by mass and more preferably 1.0% by mass because when the content thereof is small, the alignment regulation force with respect to the non-polymerizable liquid crystal compound becomes weak and when the content thereof is too large, the energy required during polymerization increases and the amount of the polymerizable compound remaining without being polymerized is increased.

In the compound represented by general formula (II) which is used as the second component, it is preferable that $R^{21}$ and $R^{22}$ each independently represent an alkyl group having 1 to 10 carbon atoms or an alkenyl group having 2 to 10 carbon atoms (one methylene group or two or more non-adjacent methylene groups present in these groups include those substituted with —O— or —S— and one or two or more of hydrogen atoms present in these groups include those substituted with a fluorine atom or a chlorine atom), more preferable that $R^{21}$ and $R^{22}$ each independently represent an alkyl group having 1 to 5 carbon atoms, an alkoxy group having 1 to 5 carbon atoms, an alkenyl group having 2 to 5 carbon atoms, or an alkenyloxy group having 3 to 6 carbon atoms, and particularly preferable that $R^{21}$ and $R^{22}$ each independently represent an alkyl group having 1 to 5 carbon atoms or an alkoxy group having 1 to 5 carbon atoms.

It is preferable that $M^{21}$, $M^{22}$, and $M^{23}$ each independently represent a trans-1,4-cyclohexylene group (one $CH_2$ group or two non-adjacent $CH_2$ groups present in the group include those substituted with an oxygen atom), a 1,4-phenylene group (one or two or more of CH groups present in the group include those substituted with a nitrogen atom), a 3-fluoro-1,4-phenylene group, a 3,5-difluoro-1,4-phenylene group, a 1,4-cyclohexenylene group, 1,4-bicyclo[2,2,2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferable that $M^{21}$, $M^{22}$, and $M^{23}$ each independently represent a trans-1,4-cyclohexylene group, a 1,4-phenylene group, or a 1,4-bicyclo[2,2,2]octylene group, and particularly preferable that $M^{21}$, $M^{22}$, and $M^{23}$ each independently represent a trans-1,4-cyclohexylene group or a 1,4-phenylene group. o is preferably 0, 1, or 2 and more preferably 0 or 1. It is preferable that $L^{21}$ and $L^{22}$ each independently represent a single bond, $—CH_2CH_2—$, $—(CH_2)_4—$, $—OCH_2—$, $—CH_2O—$, $—OCF_2—$, $—CF_2O—$, —CH═CH—, —CH═N—N═CH—, or —C≡C—, more preferable that $L^{21}$ and $L^{22}$ each independently represent $—CH_2CH_2—$, $—(CH_2)_4—$, $—OCH_2—$, or $—CH_2O—$, and particularly preferable that $L^{21}$ and $L^{22}$ each independently represent a single bond or $—CH_2CH_2—$.

Among the structures formed by the combinations of the above-described options, —CH═CH—CH═CH—, —C≡C—C≡C—, and —CH═CH—C≡C— are not preferable in terms of chemical stability. In addition, a group in which a hydrogen atom in these structures is substituted with a fluorine atom is not preferable in the same manner. Further, a structure in which oxygens are bonded to each other, a structure in which sulfur atoms are bonded to each other, and a structure in which a sulfur atom and an oxygen atom are bonded to each other are not preferable in the same manner. Further, a structure in which nitrogen atoms are bonded to each other, a structure in which a nitrogen atom and an oxygen atom are bonded to each other, and a structure in which a nitrogen atom and a sulfur atom are bonded to each other are not preferable in the same manner.

More specifically, in general formula (II), a compound represented by a group formed from general formulae (II-A) to (II-P) is preferable as a specific structure.

[Chem. 1]

(II-A)

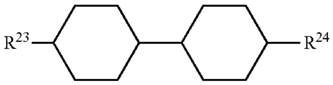

(II-B)

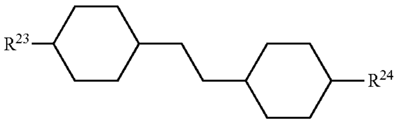

(II-C)

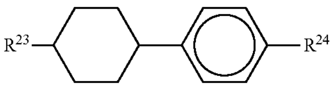

(II-D)

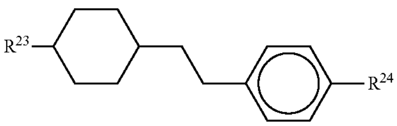

(II-E)

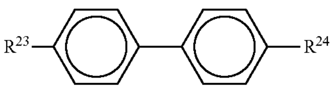

(II-F)

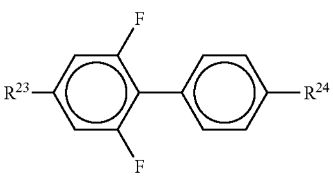

(II-G)

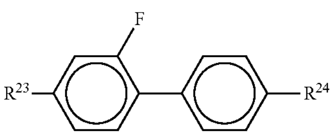

(II-H)

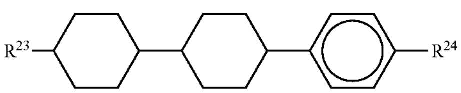

(II-I)

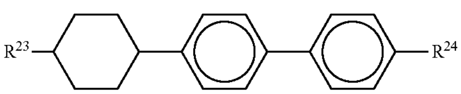

(II-J)

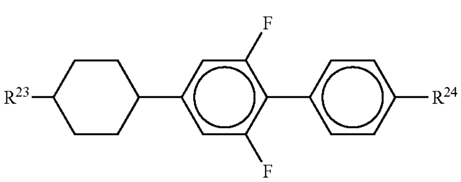

(II-K)

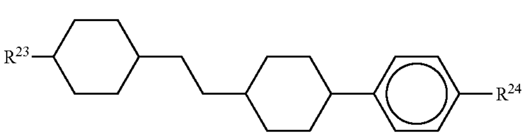

(II-L)

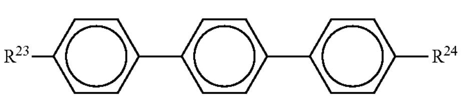

-continued (II-M)

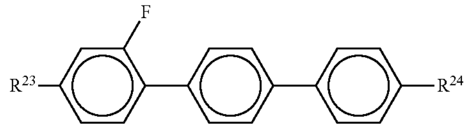

(II-N)

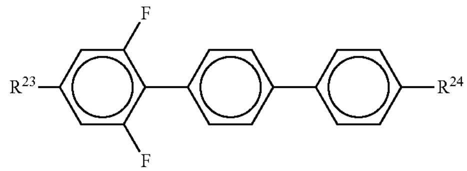

(II-O)

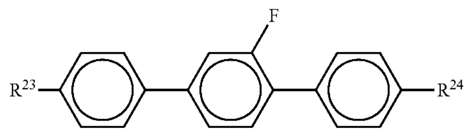

(II-P)

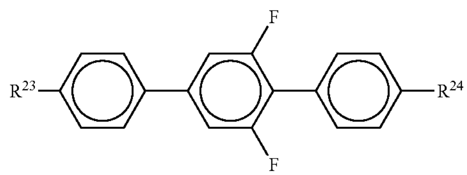

(In the formula, $R^{23}$ and $R^{24}$ each independently represent an alkyl group having 1 to 10 carbon atoms, an alkoxy group having 1 to 10 carbon atoms, an alkenyl group having 2 to 10 carbon atoms, or an alkenyloxy group having 3 to 10 carbon atoms.)

It is more preferable that $R^{23}$ and $R^{24}$ each independently represent an alkyl group having 1 to 10 carbon atoms, an alkoxy group having 1 to 10 carbon atoms, or an alkenyl group having 2 to 10 carbon atoms, and still more preferable that $R^{23}$ and $R^{24}$ each independently represent an alkyl group having 1 to 5 carbon atoms or an alkoxy group having 1 to 5 carbon atoms.

Among the compounds represented by general formulae (II-A) to (II-P), the compound represented by general formula (II-A), (II-B), (II-C), (II-E), (II-H), (II-I), (II-I), or (II-K) is preferable and the compound represented by general formula (II-A), (II-C), (II-E), (II-H), or (II-I) is more preferable.

In the present invention, at least one kind of compound represented by general formula (II) is included, but it is preferable to include 1 to 10 kinds thereof, and particularly preferable to include 2 to 8 kinds thereof, and the lower limit of the content of the compound represented by general formula (II) is preferably 5% by mass, more preferably 10% by mass, still more preferably 20% by mass, and particularly preferably 30% by mass, and the upper limit thereof is preferably 80% by mass, more preferably 70% by mass, and still more preferably 60% by mass.

In the compounds represented by general formulae (IIIa), (IIIb), and (IIIc) as a third compound, it is preferable that $R^{31}$, $R^{32}$, and $R^{33}$ each independently represent an alkyl group having 1 to 10 carbon atoms or an alkenyl group having 2 to 10 carbon atoms, a linear alkyl group having 1 to 15 carbon atoms, or an alkenyl group having 2 to 15 carbon atoms (one methylene group or two or more non-adjacent methylene groups present in these groups include those substituted with —O— or —S—, and one or two or more of hydrogen atoms present in these groups include those substituted with a fluorine atom or a chlorine atom), more preferable that $R^{31}$, $R^{32}$, and $R^{33}$ each independently represent a linear alkyl group having 1 to 10 carbon atoms, a linear alkoxy group having 1 to 10 carbon atoms, or an alkenyl group having 2 to 10 carbon atoms, and particularly preferable that $R^{31}$, $R^{32}$, and $R^{33}$ each independently represent a linear alkyl group having 1 to 8 carbon atoms or an alkoxy group having 1 to 8 carbon atoms.

It is preferable that $M^{31}$, $M^{32}$, $M^{33}$, $M^{34}$, $M^{35}$, $M^{36}$, $M^{37}$, and $M^{38}$ each independently represent a trans-1,4-cyclohexylene group (one methylene group or two or more non-adjacent methylene groups present in the group include those substituted with —O— or —S—), a 1,4-phenylene group (one —CH═ or two or more non-adjacent (—CH═)'s present in the group include those substituted with a nitrogen atom), a 1,4-cyclohexenylene group, a 1,4-bicyclo[2,2,2]octylene group, a piperidine-1,4-diyl group, a naphthalene-2,6-diyl group, a 1,2,3,4-tetrahydronaphthalene-2,6-diyl group, and a decahydronaphthalene-2,6-diyl group (each group include those in which a hydrogen atom is substituted with a cyano group, a fluorine atom, a trifluoromethyl group, a trifluoromethoxy group, or a chlorine atom), more preferable that $M^{31}$, $M^{32}$, $M^{33}$, $M^{34}$, $M^{35}$, $M^{36}$, $M^{37}$, and $M^{38}$ each independently represent a trans-1,4-cyclohexylene group, a 1,4-phenylene group, a 3-fluoro-1,4-phenylene group, or a 3,5-difluoro-1,4-phenylene group, and still more preferable that $M^{31}$, $M^{32}$, $M^{33}$, $M^{34}$, $M^{35}$, $M^{36}$, $M^{37}$, and $M^{38}$ each independently represent a trans-1,4-cyclohexylene group or a 1,4-phenylene group, and particularly preferable that $M^{31}$, $M^{32}$, $M^{33}$, $M^{34}$, $M^{35}$, $M^{36}$, $M^{37}$, and $M^{38}$ each independently represent a trans-1,4-cyclohexylene group.

It is preferable that $L^{31}$, $L^{32}$, $L^{33}$, $L^{34}$, $L^{35}$, $L^{36}$, $L^{37}$, and $L^{38}$ each independently represent a single bond, —OCO—, —COO—, —$CH_2CH_2$—, —$(CH_2)_4$—, —$OCH_2$—, —$CH_2O$—, —$OCF_2$—, —$CF_2O$—, or —C≡C—, more preferable that $L^{31}$, $L^{32}$, $L^{33}$, $L^{34}$, $L^{35}$, $L^{36}$, $L^{37}$, and $L^{38}$ each independently represent a single bond, —$CH_2CH_2$—, —$(CH_2)_4$—, or —C≡C—, and particularly preferable that $L^{31}$, $L^{32}$, $L^{33}$, $L^{34}$, $L^{35}$, $L^{36}$, $L^{37}$, and $L^{38}$ each independently represent a single bond or —$CH_2CH_2$—. $X^{31}$, $X^{32}$, $X^{33}$, $X^{34}$, $X^{35}$, $X^{36}$, and $X^{37}$ each independently represent a hydrogen atom or a fluorine atom, and it is preferable that $Y^{31}$, $Y^{32}$, and $Y^{33}$ each independently represent a hydrogen atom, a fluorine atom, a chlorine atom, a cyano group, a thiocyanate group, a trifluoromethoxy group, a trifluoromethyl group, a 2,2,2-trifluoroethyl group, a difluoromethoxy group, or an alkyl group having 1 to 12 carbon atoms, more preferable that $Y^{31}$, $Y^{32}$, and $Y^{33}$ each independently represent a hydrogen atom, a fluorine atom, a chlorine atom, a cyano group, a trifluoromethoxy group, a trifluoromethyl group, a 2,2,2-trifluoroethyl group, or an alkyl group having 1 to 12 carbon atoms, and particularly preferable that $Y^{31}$, $Y^{32}$, and $Y^{33}$ each independently represent a fluorine atom. p, q, r, s, and t each independently represent 0, 1, or 2, and each of q+r and s+t is 2 or less.

Among the structures formed by the combinations of the above-described options, —CH═CH—CH═CH—, —C≡C—C≡C—, and —CH═CH—C≡C— are not preferable in terms of chemical stability. In addition, a group in which a hydrogen atom in these structures is substituted with a fluorine atom is not preferable in the same manner. Further, a structure in which oxygens are bonded to each other, a structure in which sulfur atoms are bonded to each other, and a structure in which a sulfur atom and an oxygen atom are bonded to each other are not preferable in the same manner. Further, a structure in which nitrogen atoms are bonded to each other, a structure in which a nitrogen atom and an oxygen atom are bonded to each other, and a structure in which a nitrogen atom and a sulfur atom are bonded to each other are not preferable in the same manner.

Specifically, it is preferable to represent a structure represented by the following general formula (IIIa-1).

[Chem. 2]

(IIIa-1)

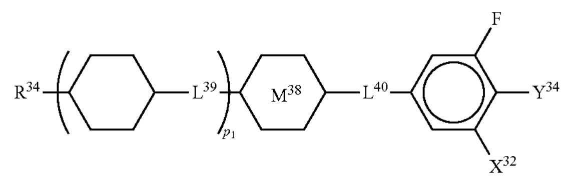

(In the formula, $R^{34}$ represents an alkyl group having 1 to 8 carbon atoms, an alkoxyl group having 1 to 8 carbon atoms, and an alkenyl group having 2 to 8 carbon atoms, $L^{39}$ and $L^{40}$ each independently represent a single bond, —$CH_2CH_2$—, —$(CH_2)_4$—, —$OCH_2$—, —$CH_2O$—, —$OCF_2$—, —$CF_2O$—, or —C≡C—, $M^{38}$ represents a 1,4-phenylene group or a trans-1,4-cyclohexylene group, $X^{32}$ represents a hydrogen atom or a fluorine atom, and $p_1$ represents 0 or 1, $Y^{34}$ represents a cyano group, a fluorine atom, a chlorine atom, a trifluoromethyl group, a fluoromethoxy group, a difluoromethoxy group, or a trifluoromethoxy group)

More specifically, structures represented by general formulae (IIIa-2a) to (IIIa-4d) are preferable,

[Chem. 3]

(IIIa-2a)

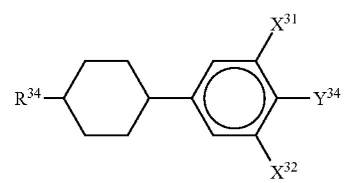

(IIIa-2b)

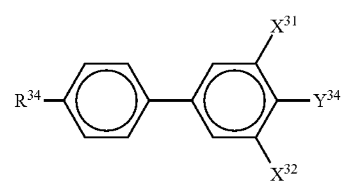

(IIIa-2c)

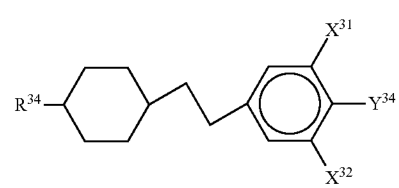

(IIIa-2d)

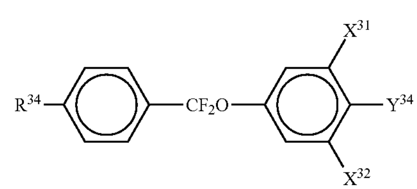

-continued
(IIIa-2e)
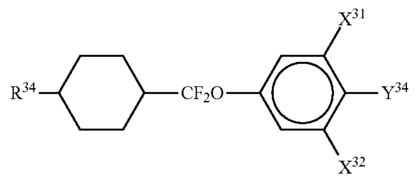
[Chem. 4]
(IIIa-3a)
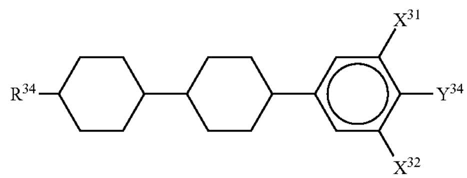
(IIIa-3b)
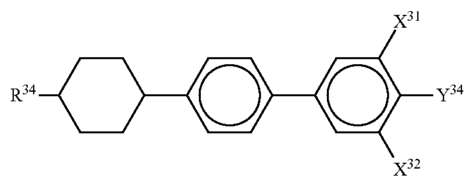
(IIIa-3c)
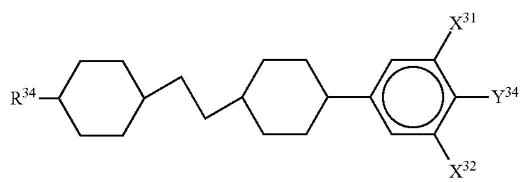
(IIIa-3d)
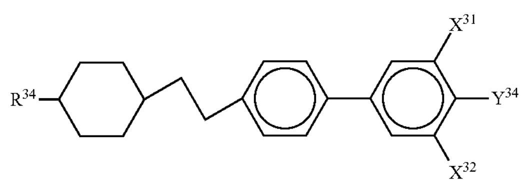
(IIIa-3e)
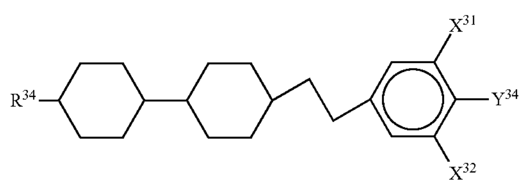
(IIIa-3f)
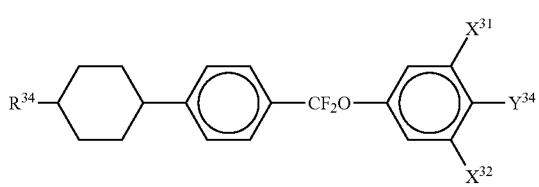
-continued
(IIIa-3g)
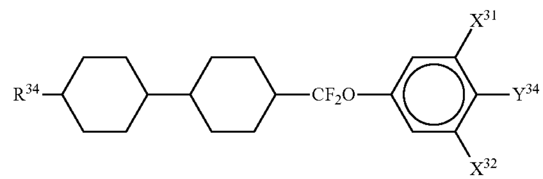
(IIIa-3h)
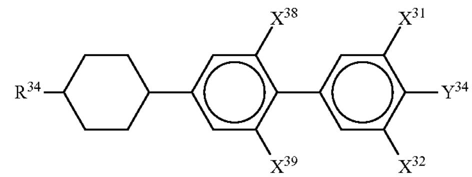
(IIIa-3i)
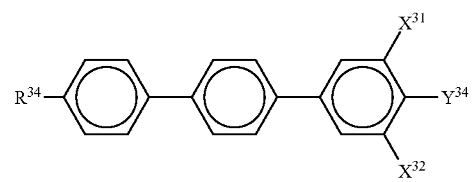
(IIIa-3j)
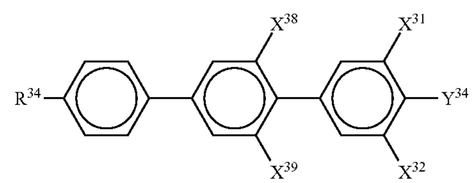
[Chem. 5]
(IIIa-4a)
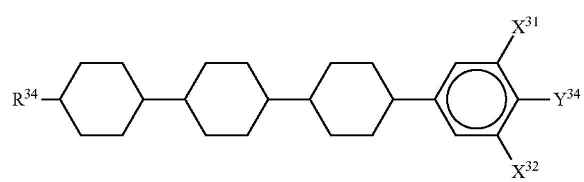
(IIIa-4b)
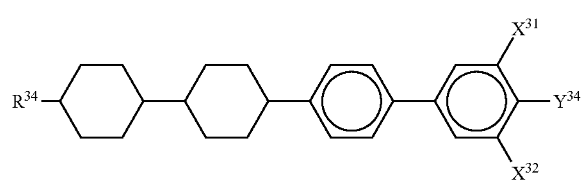
(IIIa-4c)
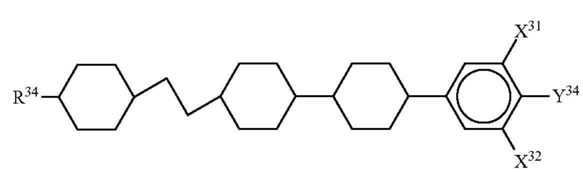

-continued (IIIa-4d)

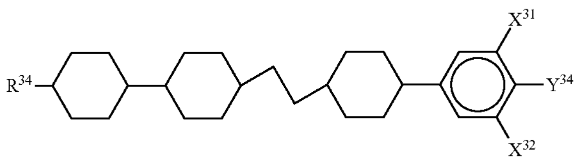

(In the formula, $R^{34}$ represents an alkyl group having 1 to 8 carbon atoms, an alkoxyl group having 1 to 8 carbon atoms, or an alkenyl group having 2 to 8 carbon atoms, $X^{31}$ and $X^{32}$ each independently represent a hydrogen atom or a fluorine atom, and $Y^{31}$ represents a cyano group, a fluorine atom, a chlorine atom, a trifluoromethyl group, a fluoromethoxy group, a difluoromethoxy group, or a trifluoromethoxy group), and structures represented by the following formula are also preferable.

[Chem. 6]

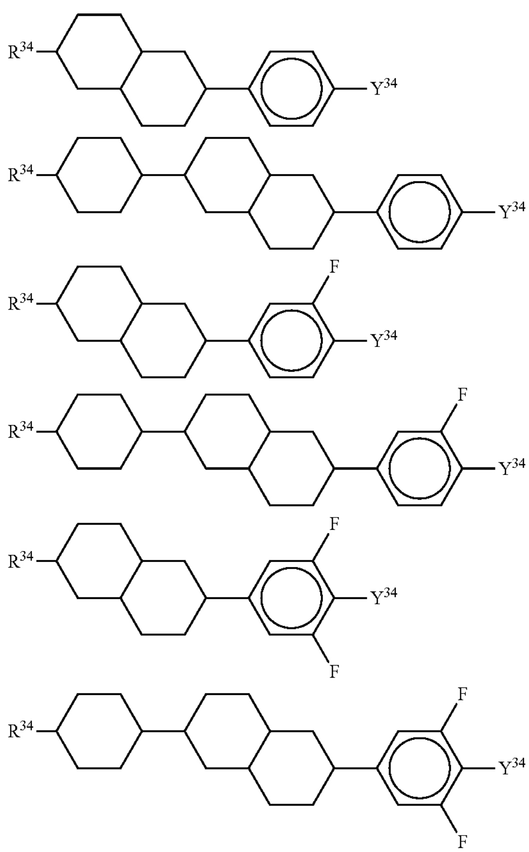

(In the formula, $R^{34}$ represents an alkyl group having 1 to 8 carbon atoms, an alkoxyl group having 1 to 8 carbon atoms, or an alkenyl group having 2 to 8 carbon atoms, and $Y^{31}$ represents a cyano group, a fluorine atom, a chlorine atom, a trifluoromethyl group, a fluoromethoxy group, a difluoromethoxy group, or a trifluoromethoxy group.)

As specific structures of general formula (IIIb), the structures represented by the following general formulae are preferable,

[Chem. 7]

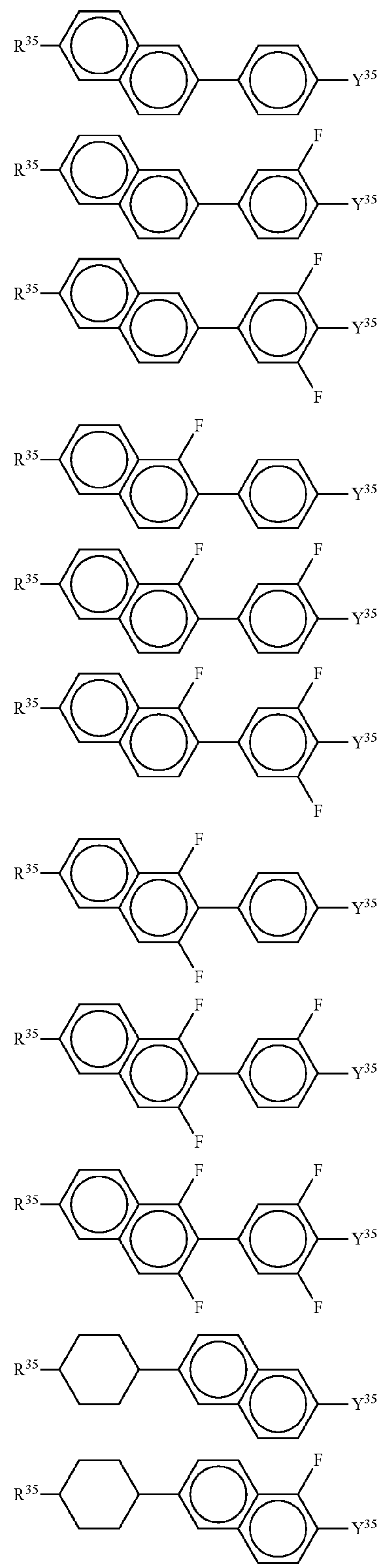

-continued
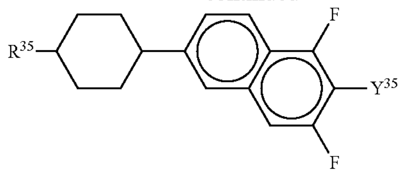
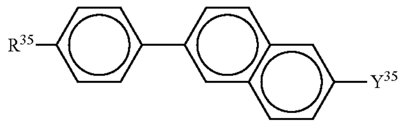
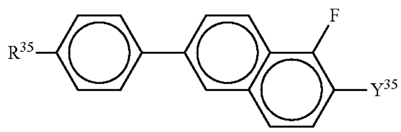
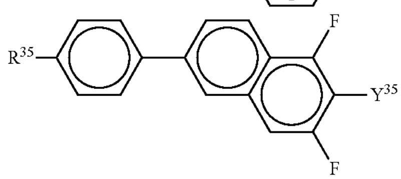
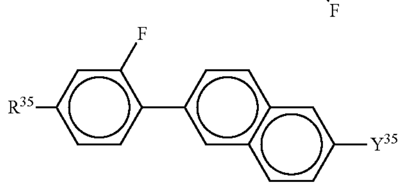
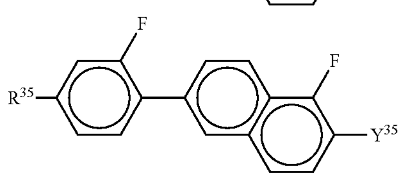
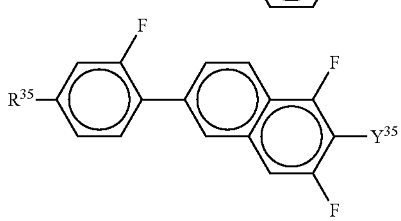
[Chem. 8]
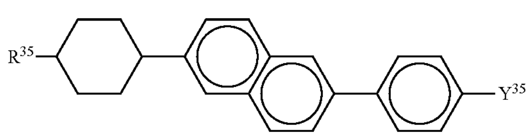
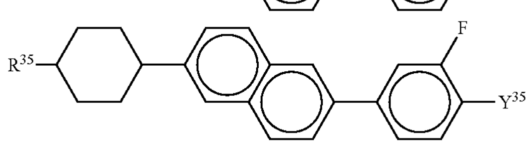
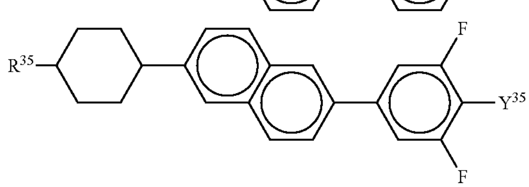
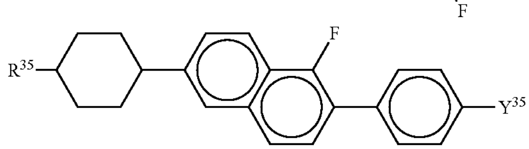
-continued
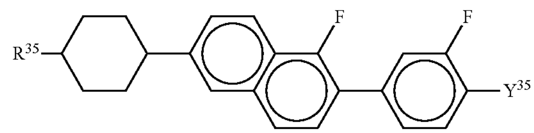
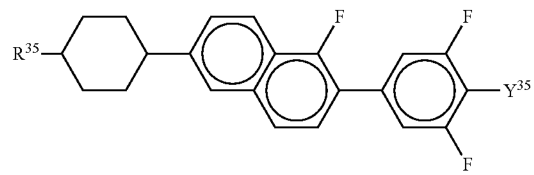
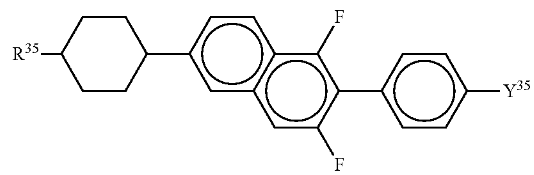
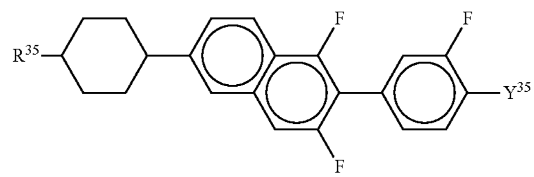
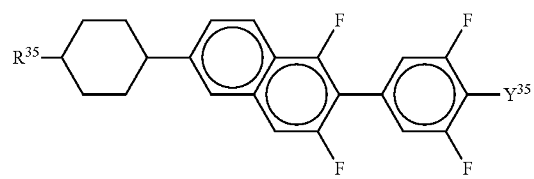
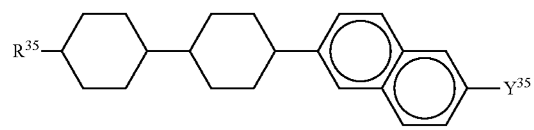
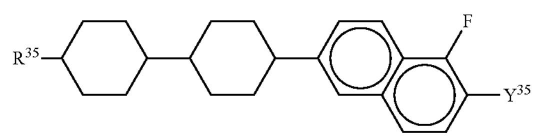
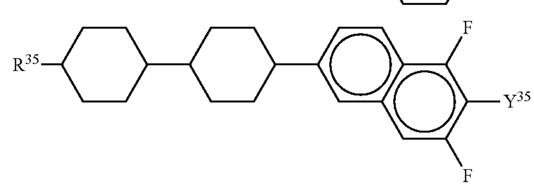
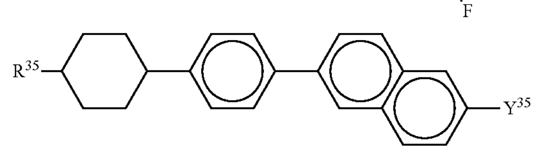
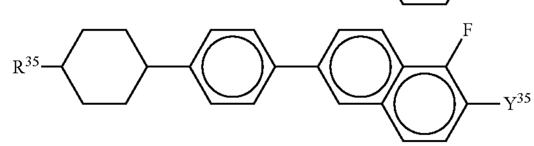
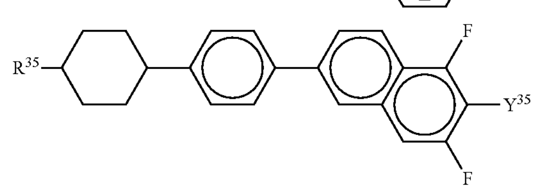

-continued

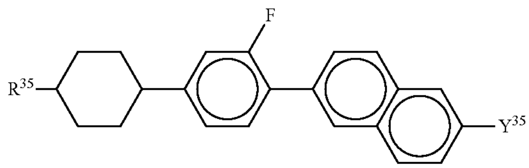

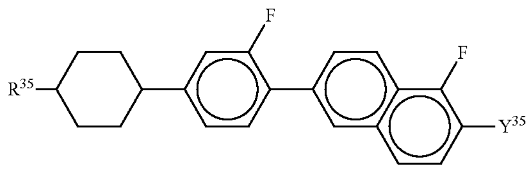

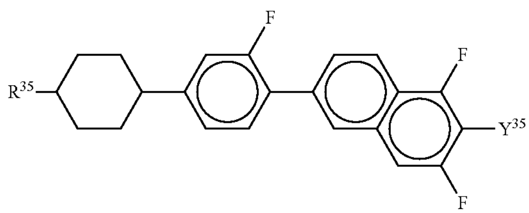

[Chem. 9]

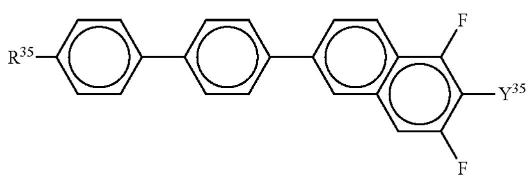

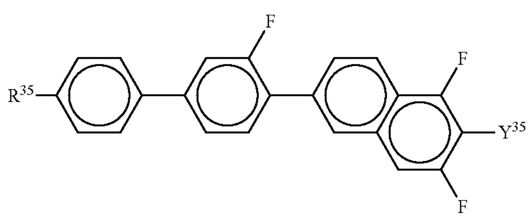

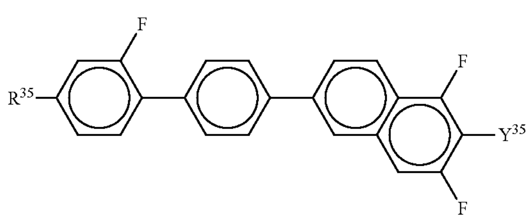

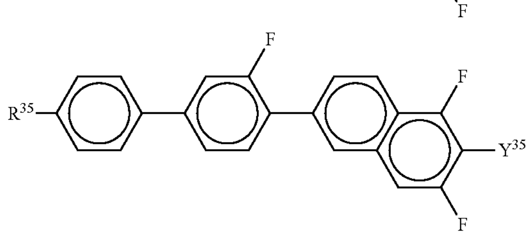

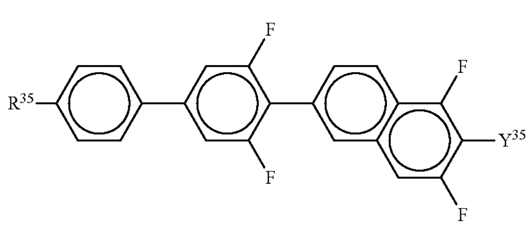

-continued

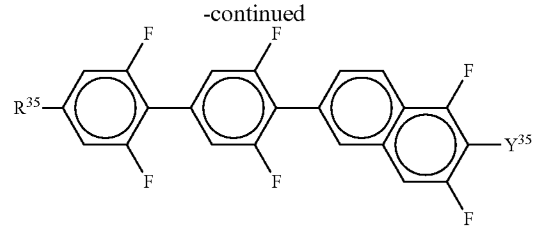

(In the formulae, $R^{35}$ represents an alkyl group having 1 to 8 carbon atoms, an alkoxyl group having 1 to 8 carbon atoms, or an alkenyl group having 2 to 8 carbon atoms, and $Y^{35}$ represents a cyano group, a fluorine atom, a chlorine atom, a trifluoromethyl group, a fluoromethoxy group, a difluoromethoxy group, or a trifluoromethoxy group), and as specific structures of general formula (IIIc), structures represented by the following formulae are preferable.

[Chem. 10]

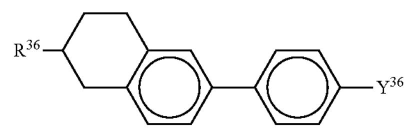

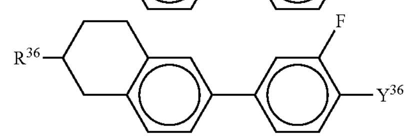

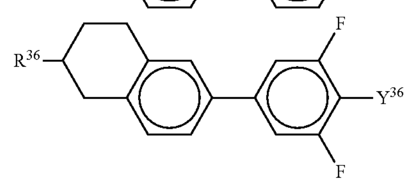

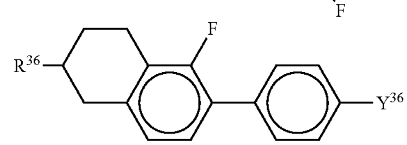

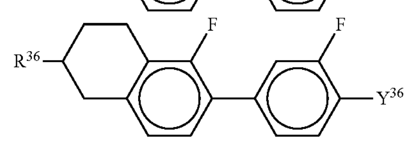

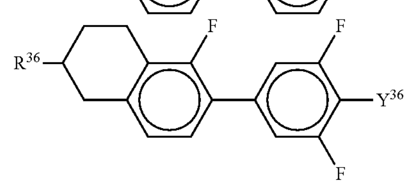

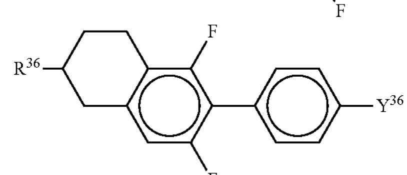

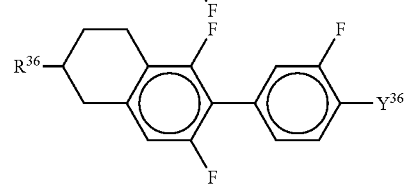

-continued

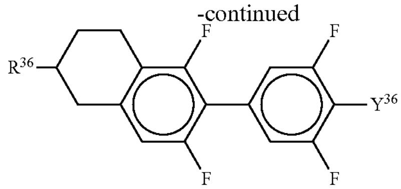

[Chem. 11]

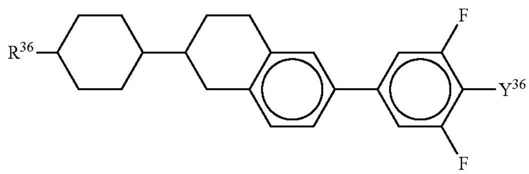

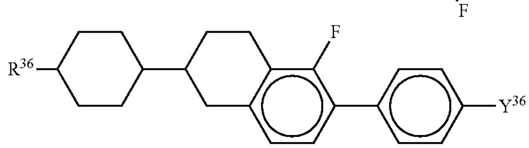

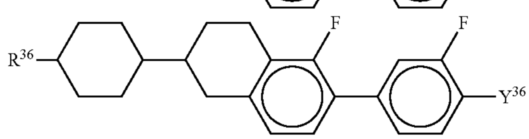

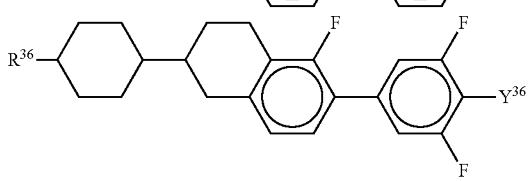

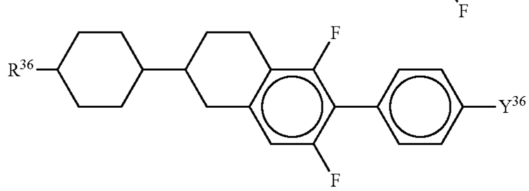

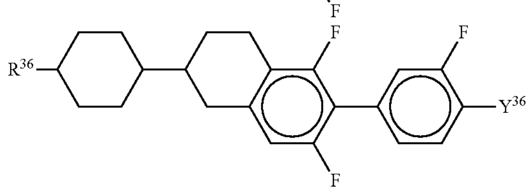

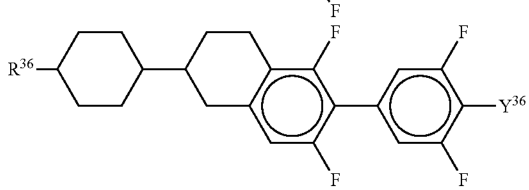

[Chem. 12]

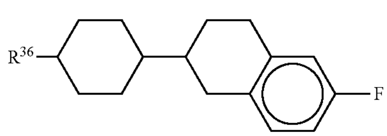

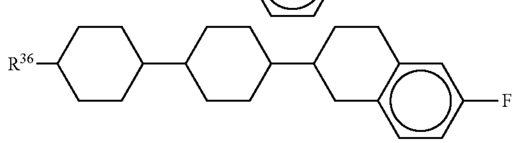

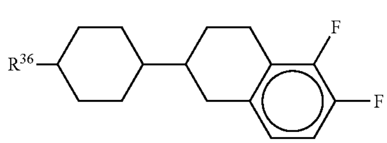

-continued

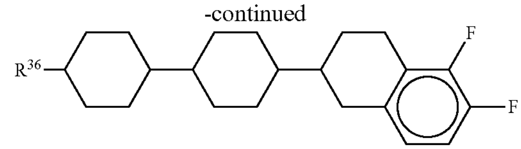

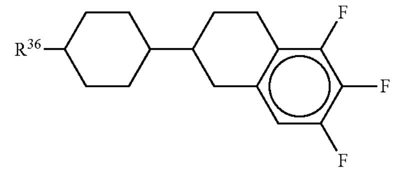

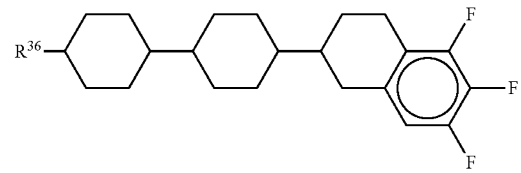

(In the formula, $R^{36}$ represents an alkyl group having 1 to 8 carbon atoms, an alkoxyl group having 1 to 8 carbon atoms, or an alkenyl group having 2 to 8 carbon atoms, and $Y^{36}$ represents a cyano group, a fluorine atom, a chlorine atom, a trifluoromethyl group, a fluoromethoxy group, a difluoromethoxy group, or a trifluoromethoxy group)

At least one kind of compound selected from the group consisting of compounds represented by general formulae (IIIa), (IIIb), and (IIIc) is included, but it is preferable to include 1 to 10 kinds thereof and particularly preferable to include 2 to 8 kinds thereof. The lower limit of the content of a group consisting of compounds represented by general formulae (IIIa), (IIIb), and (IIIc) is preferably 5% by mass, more preferably 10% by mass, and still more preferably 20% by mass, and the upper limit thereof is preferably 80% by mass, more preferably 70% by mass, even more preferably 60% by mass, and still even more preferably 50% by mass.

In addition, in the compounds represented by general formulae (IVa), (IVb), and (IVc), it is preferable that $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, a linear alkyl group having 1 to 15 carbon atoms, or an alkenyl group having 2 to 15 carbon atoms (one methylene group or two or more non-adjacent methylene groups present in these groups include those substituted with —O— or —S—, and one or two or more of hydrogen atoms present in these groups include those substituted with a fluorine atom or a chlorine atom), more preferable that $R^{41}$, $R^{42}$, $R^{43}$, $R^{44}$, $R^{45}$, and $R^{46}$ each independently represent a linear alkyl group having 1 to 10 carbon atoms, a linear alkoxy group having 1 to 10 carbon atoms, or an alkenyl group having 2 to 10 carbon atoms, and particularly preferable that $R^{41}$, $R^{42}$, $R^{43}$, $R^{44}$, $R^{45}$, and $R^{46}$ each independently represent a linear alkyl group having 1 to 8 carbon atoms or an alkoxy group having 1 to 8 carbon atoms. It is preferable that $M^{41}$, $M^{42}$, $M^{43}$, $M^{44}$, $M^{45}$, $M^{46}$, $M^{47}$, $M^{48}$, and $M^{49}$ each independently represent a trans-1,4-cyclohexylene group (one methylene group or two or more non-adjacent methylene groups present in the group include those substituted with —O— or —S—), a 1,4-phenylene group (one —CH═ or two or more non-adjacent (—CH═)'s present in the group include those substituted with a nitrogen atom), a 1,4-cyclohexenylene group, a 1,4-bicyclo(2,2,2)octylene group, a piperidine-2,5-diyl group, a naphthalene-2,6-diyl group, a 1,2,3,4-tetrahydronaphthalene-2,6-diyl group, and a decahydronaphthalene-2,6-diyl group (each group includes those in which a hydrogen atom is substituted with a cyano group, a fluorine atom, a trifluoromethyl group, a trifluoromethoxy group, or a chlorine atom), more preferable that $M^{41}$, $M^{42}$, $M^{43}$, $M^{44}$, $M^{45}$, $M^{46}$, $M^{47}$, $M^{48}$, and $M^{49}$ each independently represent a trans-1,4-cyclohexylene group, a 1,4-phenylene group, a 3-fluoro-1,4-phenylene group, or a 2,3-difluoro-1,4-phenylene group, and still more preferable that $M^{41}$, $M^{42}$, $M^{43}$, $M^{44}$, $M^{45}$, $M^{46}$, $M^{47}$, $M^{48}$, and $M^{49}$ each independently represent a trans-1,4-cyclohexylene group or a 1,4-phenylene group, and particularly preferable that $M^{41}$, $M^{42}$, $M^{43}$, $M^{44}$, $M^{45}$, $M^{46}$, $M^{47}$, $M^{48}$, and $M^{49}$ each independently represent a trans-1,4-cyclohexylene group. It is preferable that $L^{41}$, $L^{42}$, $L^{43}$, $L^{44}$, $L^{45}$, $L^{46}$, $L^{47}$, $L^{48}$, and $L^{49}$ each independently represent a single bond, —$CH_2CH_2$—, —$(CH_2)_4$—, —OCO—, —COO—, —$OCH_2$—, —$CH_2O$—, —$OCF_2$—, —$CF_2O$—, or —C≡C—, and more preferable that $L^{41}$, $L^{42}$, $L^{43}$, $L^{44}$, $L^{45}$, $L^{46}$, $L^{47}$, $L^{48}$, and $L^{49}$ each independently represent a single bond, —$CH_2CH_2$—, —$OCH_2$—, or —$CH_2O$—. $X^{41}$, $X^{42}$, $X^{43}$, $X^{44}$, $X^{45}$, $X^{46}$, and $X^{47}$ each independently represent a hydrogen atom or a fluorine atom, G represents a methylene group or —O—, and u, v, w, x, y, and z each independently represent 0, 1, or 2, and u+v, w+x, and y+z are each 2 or less.

In the compounds represented by general formula (IVa), specifically, it is preferable to represent the structure represented by the following general formula (IVa-1).

[Chem.13]

(IVa-1)

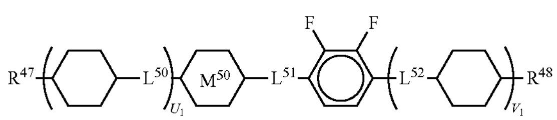

(In the formula, $R^{47}$ and $R^{48}$ each independently represent an alkyl group having 1 to 8 carbon atoms, an alkoxyl group having 1 to 8 carbon atoms, or an alkenyl group having 2 to 8 carbon atoms, $L^{50}$, $L^{51}$, and $L^{52}$ each independently represent a single bond, —$CH_2CH_2$—, —$(CH_2)_4$—, —$OCH_2$—, —$CH_2O$—, —$OCF_2$—, —$CF_2O$—, or —C≡C—, $M^{50}$ represents a 1,4-phenylene group or a trans-1,4-cyclohexylene group, and $u_1$ and $v_1$ each independently represent 0 or 1).

More specifically, the structures represented by the following general formulae (IVa-2a) to (IVa-3i) are preferable,

[Chem. 14]

(IVa-2a)

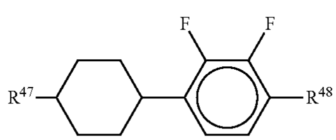

(IVa-2b)

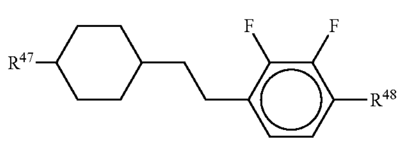

(IVa-2c)

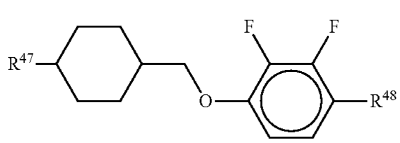

-continued (IVa-2d)

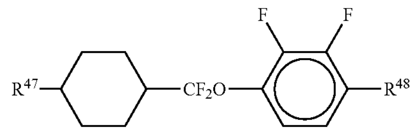

[Chem. 15]

(IVa-3a)

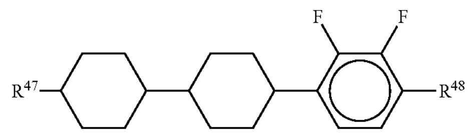

(IVa-3b)

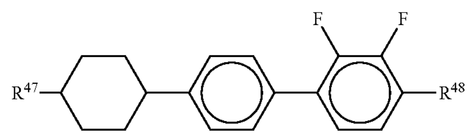

(IVa-3c)

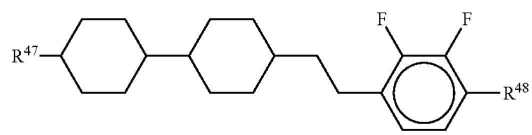

(IVa-3d)

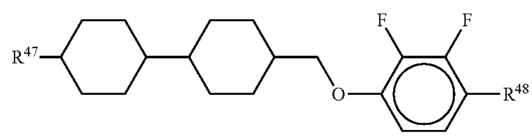

(IVa-3e)

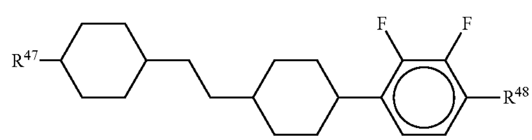

(IVa-3f)

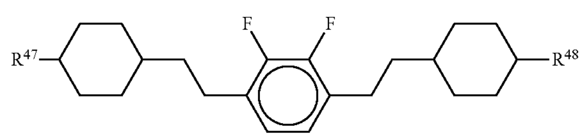

(IVa-3g)

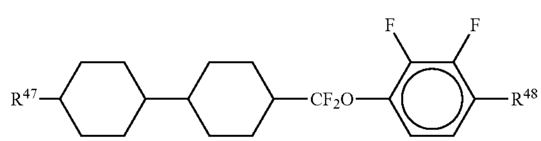

(IVa-3h)

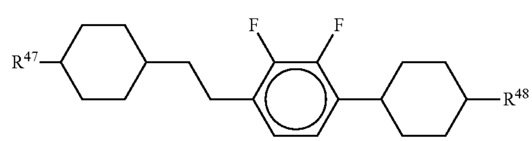

(IVa-3i)

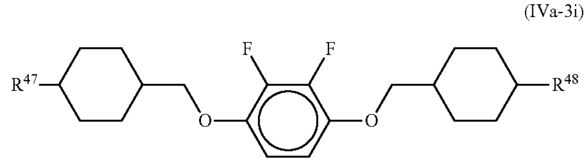

(in the formulae, $R^{47}$ and $R^{48}$ each independently represent an alkyl group having 1 to 8 carbon atoms, an alkoxyl group having 1 to 8 carbon atoms, or an alkenyl group having 2 to 8 carbon atoms), and the structures in which $R^{47}$ and $R^{48}$ each independently represent an alkyl group having 1 to 8 carbon atoms or an alkoxyl group having 1 to 8 carbon atoms are more preferable.

In the compounds represented by general formula (IVb), specifically, it is preferable to represent the structure represented by the following general formula (IVb-1).

[Chem. 16]

(IVb-1)

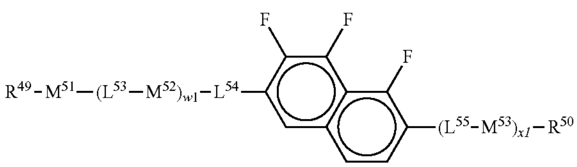

(In the formula, $R^{49}$ and $R^{50}$ each independently represent an alkyl group having 1 to 8 carbon atoms, an alkoxyl group having 1 to 8 carbon atoms, and an alkenyl group having 2 to 8 carbon atoms, $L^{52}$, $L^{53}$, and $L^{54}$ each independently represent a single bond, —$CH_2CH_2$—, —$(CH_2)_4$—, —$OCH_2$—, —$CH_2O$—, —$OCF_2$—, —$CF_2O$—, or —C≡C—, $M^{51}$, $M^{52}$, and $M^{53}$ represent a 1,4-phenylene group or a trans-1,4-cyclohexylene group, and w1 and x1 independently represent 0, 1, or 2, and w1+x1 is 2 or less).

More specifically, the structures represented by the following general formulae (IVb-2a) to (IVb-31) are preferable,

[Chem. 17]

(IVb-2a)

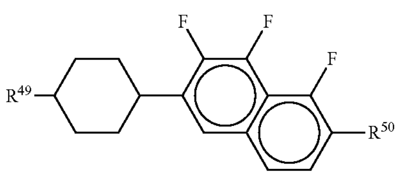

(IVb-2b)

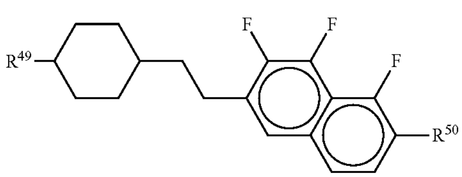

(IVb-2c)

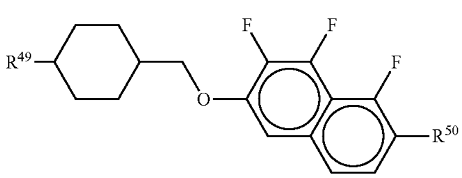

(IVb-2d)

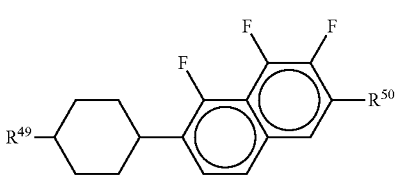

-continued (IVb-2e)

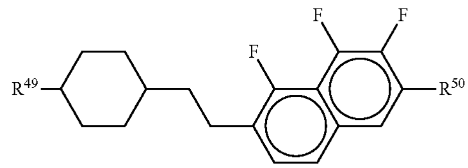

[Chem. 18]

(IVb-3a)

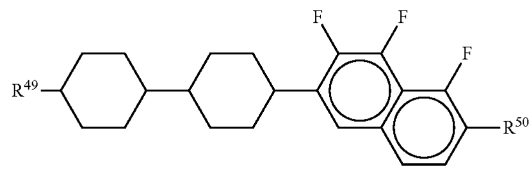

(IVb-3b)

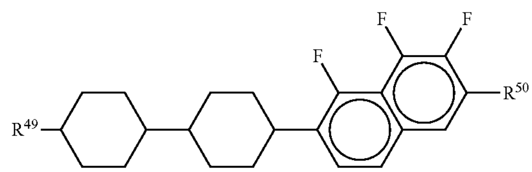

(IVb-3c)

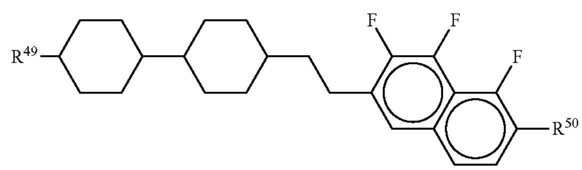

(IVb-3d)

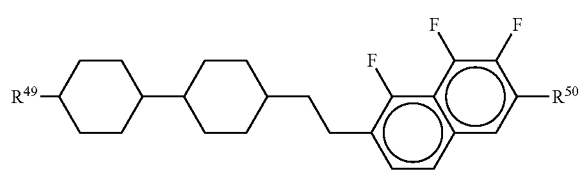

(IVb-3e)

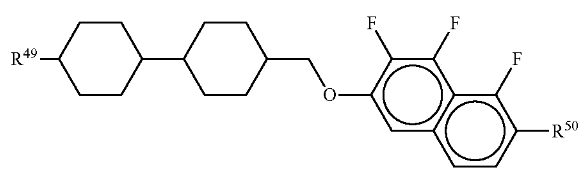

(IVb-3f)

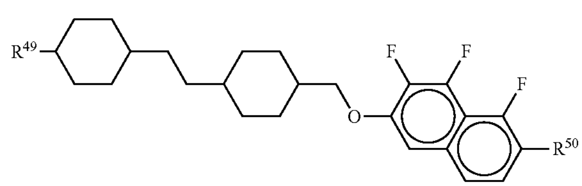

(in the formula, $R^{49}$ and $R^{50}$ each independently represent an alkyl group having 1 to 8 carbon atoms, an alkoxyl group having 1 to 8 carbon atoms, or an alkenyl group having 2 to 8 carbon atoms.)

In the compounds represented by general formula (IVc), specifically, it is preferable to represent the structure represented by the following general formulae (IVc-1a) and (IVc-1b).

[Chem. 19]

(IVc-1a)

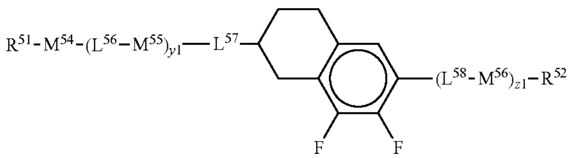

(IVc-1b)

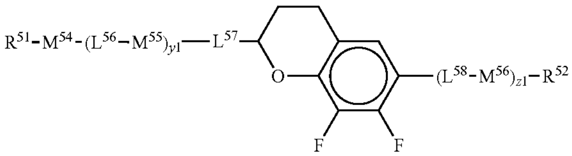

(in the formulae, $R^{51}$ and $R^{52}$ each independently represent an alkyl group having 1 to 8 carbon atoms, an alkoxyl group having 1 to 8 carbon atoms, and an alkenyl group having 2 to 8 carbon atoms, $L^{56}$, $L^{57}$, and $L^{58}$ each independently represent a single bond, —$CH_2CH_2$—, —$(CH_2)_4$—, —$OCH_2$—, —$CH_2O$—, —$OCF_2$—, —$CF_2O$—, or —C≡C—, $M^{54}$, $M^{55}$, and $M^{56}$ represent a 1,4-phenylene group or a trans-1,4-cyclohexylene group, and y1 and z1 independently represent 0, 1, or 2, and y1+z1 is 2 or less).

More specifically, the structures represented by general formulae (IVc-2a) to (IVc-2g) are preferable.

[Chem. 20]

(IVc-2a)

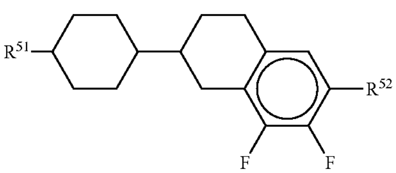

(IVc-2b)

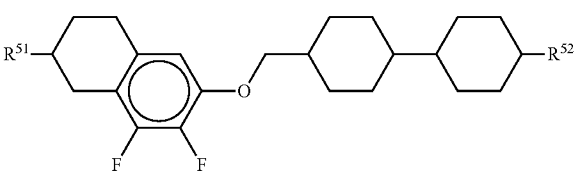

(IVc-2c)

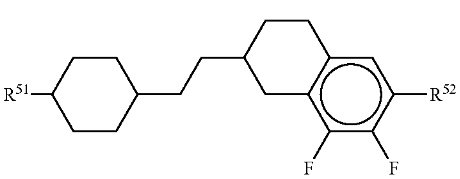

(IVc-2d)

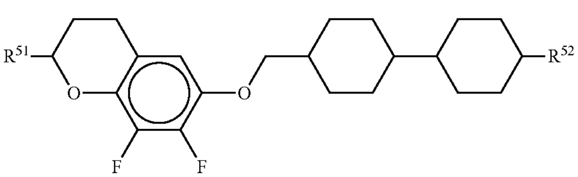

-continued (IVc-2e)

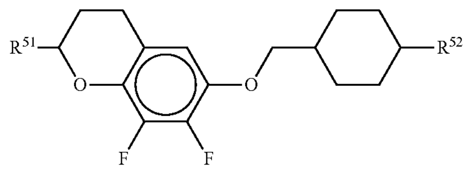

(IVc-2f)

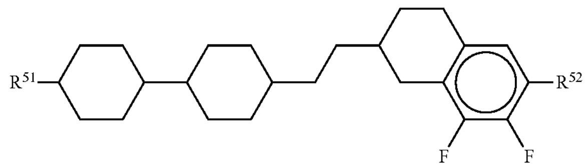

(IVc-2g)

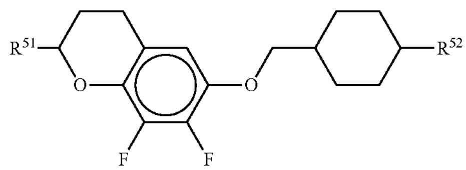

(in the formulae, $R^{51}$ and $R^{52}$ each independently represent an alkyl group having 1 to 8 carbon atoms, an alkoxyl group having 1 to 8 carbon atoms, or an alkenyl group having 2 to 8 carbon atoms).

At least one kind of compound, which is used as the third component, selected from the group consisting of compounds represented by general formulae (IIIa), (IIIb), and (IIIc) or at least one kind of compound selected from the group consisting of compounds represented by general formulae (IVa), (IVb), or (IVc) is included, but it is preferable to include 2 to 10 kinds thereof and particularly preferable to include 2 to 8 kinds thereof. The lower limit of the content thereof is preferably 5% by mass, more preferably 10% by mass, and still more preferably 20% by mass, and the upper limit thereof is preferably 80% by mass, more preferably 70% by mass, even more preferably 60% by mass, and still even more preferably 50% by mass.

In the liquid crystal composition of the present invention, $\Delta n$ is preferably in the range of 0.08 to 0.25.

The following things are applicable to all compounds used in the present invention: among the structures of the compounds, —CH═CH—CH═CH—, —C≡C—C≡C—, and —CH═CH—C≡C— are not preferable in terms of chemical stability. In addition, a group in which a hydrogen atom in these structures is substituted with a fluorine atom or the like is not preferable in the same manner. Further, a structure in which oxygens are bonded to each other, a structure in which sulfur atoms are bonded to each other, and a structure in which a sulfur atom and an oxygen atom are bonded to each other are not preferable in the same manner. Further, a structure in which nitrogen atoms are bonded to each other, a structure in which a nitrogen atom and an oxygen atom are bonded to each other, and a structure in which a nitrogen atom and a sulfur atom are bonded to each other are not preferable in the same manner.

In the liquid crystal composition of the present invention, with regard to $\Delta\varepsilon$, a composition including positive $\Delta\varepsilon$ or negative $\Delta\varepsilon$ can be used depending on the display mode of a liquid crystal display element. In a liquid crystal display element with MVA (Multi-domain Vertical Alignment)

mode, a liquid crystal composition including negative Δε is used. The value of Δε in this case is preferably −1 or less and more preferably −2 or less.

The liquid crystal composition of the present invention has a wide liquid crystal phase temperature range (absolute value of difference between lower limit temperature of liquid crystal phase and upper limit temperature of liquid crystal phase), but the liquid crystal phase temperature range is preferably 100° C. or more and more preferably 120° C. or more. In addition, the upper limit temperature of the liquid crystal phase is preferably 70° C. or higher and more preferably 80° C. or higher. Further, the lower limit temperature of the liquid crystal phase is −20° C. or less and more preferably −30° C. or less.

In the liquid crystal composition of the present invention, general nematic liquid crystal, smectic liquid crystal, or cholesteric liquid crystal may be contained in addition to the compounds described above.

In the liquid crystal composition containing a polymerizable compound of the present invention, the polymerization thereof proceeds even when a polymerization initiator is not present, but a polymerization initiator may be contained in order to accelerate the polymerization. Examples of the polymerization initiator may include benzoin ethers, benzophenones, acetophenones, benzyl ketals, or acylphosphine oxides.

In the liquid crystal composition of the present invention, a stabilizer can be added in order to improve storage stability. Examples of the stabilizer which can be used include hydroquinones, hydroquinone monoalkyl ethers, tertiary butyl catechols, pyrogallols, thiophenols, nitro compounds, β-naphthylamines, β-naphthols, and nitroso compounds. The amount of the stabilizer added when being used is preferably in the range of 0.005% by mass to 1% by mass, more preferably in the range of 0.02% by mass to 0.5% by mass, and particularly preferably in the range of 0.03% by mass to 0.1% by mass based on the liquid crystal composition.

The liquid crystal alignment capability is provided to the liquid crystal composition of the present invention by polymerizing the polymerizable composition in the liquid crystal composition, and the liquid crystal composition is used for a liquid crystal display element which controls the quantity of transmitted light using the birefringence of the liquid crystal composition. The liquid crystal composition is useful for, as liquid crystal display elements, an AM-LCD (active-matrix liquid crystal display element), a TN (nematic liquid crystal display element), a STN-LCD (super-twisted nematic liquid crystal display element), an OCB-LCD, and an IPS-LCD (in-plane switching liquid crystal display element). Among these, the liquid crystal composition is particularly useful for an AM-LCD and can be used for a transmission type or reflection type liquid crystal display element.

As two sheets of substrates of liquid crystal cells being used for the liquid crystal display element, glass or transparent materials having flexibility such as plastic may be used, and as one of the two sheets, opaque materials such as silicon may also be used. A transparent substrate having a transparent electrode layer can be obtained by sputtering indium tin oxide (ITO) on the transparent substrate such as a glass plate for example.

A color filter can be prepared by, for example, a pigment dispersion method, a printing method, an electrodeposition method, or a dyeing method. The method of preparing a color filter using a pigment dispersion method will be described as an example. A curable coloring composition for a color filter is coated on the transparent substrate, a patterning treatment is applied thereto, and the composition is allowed to be cured by heating or irradiation with light. A pixel portion for a color filter can be prepared by performing this process with each of three colors, which are red, green, and blue. In addition, a pixel electrode on which a TFT, a thin film diode, or an active element such as a metal-insulator-metal specific resistance element is provided may be provided.

The substrates are allowed to face each other such that the transparent electrode layer is located inside. At this time, the space between substrates may be adjusted via a spacer. The thickness of a light adjusting layer to be obtained is preferably adjusted such that the thickness thereof is in the range of 1 μm to 100 μm. The thickness thereof is more preferably in the range of 1.5 μm to 10 μm, and it is preferable to adjust the product between refractive index anisotropy Δn and cell thickness d of the liquid crystal such that the contrast thereof becomes the maximum when a polarizer is used. Further, when two polarizers are present, a view angle or contrast of the polarizers can be adjusted to be excellent by adjusting the polarization axis of each of the polarizers. In addition, a phase difference film can be used to widen the view angle. Examples of the spacer may include glass particles, plastic particles, alumina particles, and photoresist materials. Subsequently, screen printing of a sealant of an epoxy-based thermosetting composition or the like is performed on the substrates in a state of providing a liquid crystal injection port, and the substrates are attached to each other, and then the substrates are heated to heat-cure the sealant.

As a method of interposing a polymer-stabilized liquid crystal composition between two substrates, a vacuum injection method or an ODF (One Drop Fill) method can be used.

As a method of polymerizing a polymerizable compound, a method of polymerizing a polymerizable compound by irradiation with active energy rays such as ultraviolet rays or electron rays is preferable because the progress of the polymerization is desired to be fast. In a case of using ultraviolet rays, a polarization light source or a non-polarization light source may be used. Further, in a case where polymerization is performed in a state in which a liquid crystal composition is interposed between two sheets of substrates, appropriate transparency is necessarily applied to at least the substrate on the surface side of irradiation with respect to the active energy rays. Alternatively, polymerization may be performed by polymerizing only a specific portion using a mask at the time of irradiation with light, changing the conditions such as an electric field, a magnetic field, or a temperature to change the state of alignment of the non-polymerized portion, and performing irradiation with active energy rays. Particularly, at the time of exposure to ultraviolet rays, it is preferable to perform exposure to ultraviolet rays while applying the alternate current to a polymerizable-compound-containing liquid crystal composition. The frequency of the alternative current to be applied is preferably in the range of 10 Hz to 10 kHz and more preferably in the range of 60 Hz to 10 kHz, and the voltage is selected depending on a desired pretilt angle of the liquid crystal display element. That is, it is possible to control the pretilt angle of the liquid crystal display element by the voltage to be applied. In the liquid crystal display element with the MVA mode, the pretilt angle is preferably controlled to be in the range of 80° to 89° from a viewpoint of the alignment stability and the contrast.

The temperature at the time of irradiation is preferably in the temperature range in which the state of the liquid crystal in the liquid crystal composition of the present invention is maintained. It is preferable to perform polymerization at a temperature close to room temperature, that is, typically a temperature of 15° C. to 35° C. As a lamp generating ultraviolet rays, a metal halide lamp, a high-pressure mercury lamp, or an ultrahigh-pressure mercury lamp can be used. As a wavelength of ultraviolet rays used for irradiation, it is preferable to perform irradiation with ultraviolet rays in the wavelength region which is not the absorption wavelength region of the liquid crystal composition, and it is preferable that ultraviolet rays be cut to be used if necessary. The intensity of ultraviolet rays used for irradiation is preferably in the range of 0.1 $mW/cm^2$ to 100 $W/cm^2$ and more preferably in the range of 2 $mW/cm^2$ to 50 $W/cm^2$. The amount of energy of ultraviolet rays used for irradiation can be appropriately adjusted, but the amount thereof is preferably in the range of 1 $mJ/cm^2$ to 500 $J/cm^2$ and more preferably in the range of 100 $mJ/cm^2$ to 200 $J/cm^2$. The intensity thereof may be changed when performing irradiation with ultraviolet rays. The irradiation time of ultraviolet rays is appropriately selected depending on the intensity of ultraviolet rays used for irradiation, but the time thereof is preferably in the range of 10 seconds to 3600 seconds.

EXAMPLES

Hereinafter, the present invention will be more specifically described with reference to the examples, but the present invention is not limited thereto. Further, "%" in the compositions of the following examples and the comparative examples means "% by mass."

The physical properties of the liquid crystal composition are expressed as follows.

$T_{N-I}$ (° C.): nematic phase-isotropic liquid phase transition temperature (upper limit temperature of liquid crystal phase)

Δε: dielectric anisotropy

Δn: refractive index anisotropy

Vth (V): applied voltage whose transmittance is changed by 10% when a rectangular wave having a frequency of 1 kHz is applied (threshold voltage)

(Method of Measuring Amount of Monomer Remained after UV Curing)

A liquid crystal composition is injected to a liquid crystal cell and irradiation of ultraviolet rays are performed to polymerize a polymerizable compound. Subsequently, the liquid crystal cell is decomposed, and an acetonitrile solution of an elution component containing a liquid crystal material, a polymerized product, and an unpolymerized polymerizable compound is obtained. The peak area of each component is measured using high speed liquid chromatography (column: reverse-phase nonpolar column, developing solvent: acetonitrile). The amount of the remained polymerizable compound is determined based on the peak area of the liquid crystal material as an index and the peak area ratio of the unpolymerized polymerizable compound. The residual amount of the monomer was determined based on the value and the amount of the polymerizable compound initially added. Further, the detection limit of the residual amount of the polymerizable compound was 500 ppm.

Example 1

A liquid crystal composition LC-1 containing a compound selected from general formula (II), a compound selected from general formulae (IIIa), (IIIb), and (IIIc), or a compound selected from general formulae (IVa), (IVb), and (IVc) was prepared. The constituting compounds and the content ratios are as follows.

[Chem. 21]

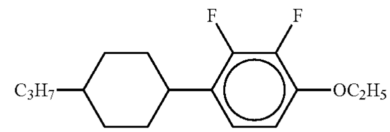

10%

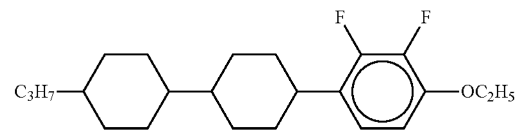

15%

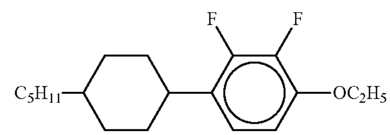

10%

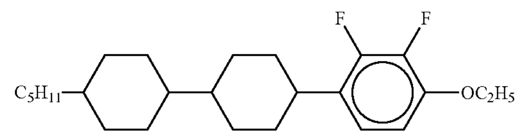

15%

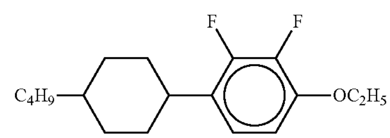

10%

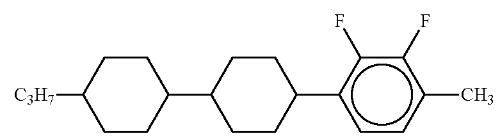

10%

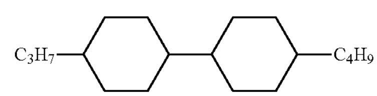

10%

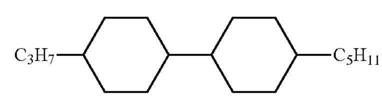

5%

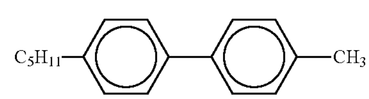

5%

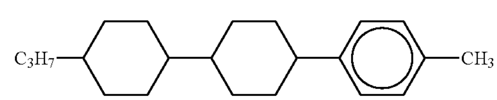

10%

The physical properties of the liquid crystal composition LC-1 are listed in Table 1.

TABLE 1

| | |
|---|---|
| $T_{N-I}$ (° C.) | 80.1 |
| Δε | −3.5 |
| Δn | 0.088 |

A polymerizable liquid crystal composition CLC-1 was prepared by adding 0.3% of the polymerizable compound represented by formula (I-2) to 99.7% of a liquid crystal composition LC-1 to be uniformly dissolved.

[Chem. 22]

(I-2)

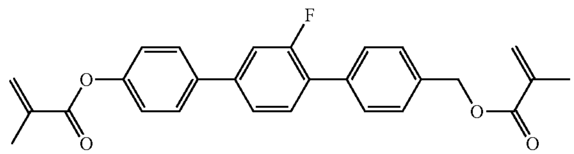

The physical properties of CLC-1 were not substantially different from the physical properties of above-described LC-1. Accordingly, it was revealed that the polymerizable compound represented by formula (I-2) did not degrade the liquid crystal properties of the liquid crystal composition to be added. Further, it was revealed that the polymerizable compound represented by formula (I-2) had excellent compatibility with another liquid crystal compound because when the CLC-1 was stored in a cold place (−20° C.) for 4 weeks, deposition or the like did not occur. The CLC-1 was injected to a cell with ITO on which a polyimide alignment film which induces homeotropic alignment was coated with a cell gap of 3.5 μm using a vacuum injection method. The pretilt angle of the cell was measured (using crystal rotation method) and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Irradiation of ultraviolet rays was performed for 600 seconds by adjusting the irradiation intensity such that the irradiation intensity on the surface of the cell became 10 mW/cm$^2$, thereby obtaining a vertical alignment liquid crystal display element allowing the polymerizable compound in the polymerizable liquid crystal composition to be polymerized. The pretilt angle before and after the irradiation with ultraviolet rays on the liquid crystal display element and electrooptical characteristics thereof are listed in Table 2.

TABLE 2

| | |
|---|---|
| Pretilt angle before irradiation with ultraviolet rays | 89.5 |
| Pretilt angle after irradiation with ultraviolet rays | 87.3 |
| Vth (V) | 1.64 |

From the results of the above-described pretilt angle, it was revealed that the alignment regulation force with respect to the liquid crystal compound was generated by polymerization of the polymerizable compound and a vertical alignment liquid crystal display element in which the pretilt angle was fixed in a state of a liquid crystal molecule being inclined by 2.2° in the vertical direction was obtained.

Further, the content of the compound which is represented by general formula (I-2) and contained in the liquid crystal display element was analyzed with liquid chromatograph analysis, but the content was not detected. Based on the above result, it was confirmed that the polymerizable compound represented by general formula (I-2) was able to be polymerized without using a polymerization initiator and the amount of an unpolymerized product remained after the polymerization was less than or equal to the detection limit.

Comparative Example 1

A polymerizable liquid crystal composition CLC-A was prepared by adding 0.3% of the polymerizable compound represented by formula (A) to 99.7% of a liquid crystal composition LC-1 to be uniformly dissolved.

[Chem. 23]

(A)

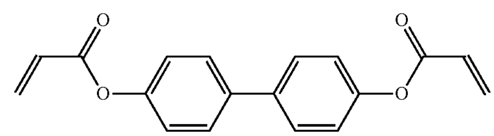

The CLC-A was injected to a cell with ITO on which a polyimide alignment film which induces homeotropic alignment was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Irradiation of ultraviolet rays was performed for 600 seconds by adjusting the irradiation intensity such that the irradiation intensity on the surface of the cell became 10 mW/cm$^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.7°, whereas the pretilt angle after irradiation was 89.5°, and there was substantially no change in the pretilt angle and a liquid crystal molecule was not inclined in the vertical direction substantially. The content of the compound which is represented by general formula (A) and contained in the liquid crystal display element was analyzed with liquid chromatograph analysis, but the content thereof exhibited no change between before and after the irradiation, and polymerization of the polymerizable compound (A) was not proceeded. Further, it was revealed that the polymerizable compound represented by formula (A) had poor compatibility with another liquid crystal compound because when the CLC-A was stored in a cold place (−20° C.) for 1 week, deposition occurred.

Comparative Example 2

A polymerizable liquid crystal composition CLC-B was prepared by adding 0.3% of the polymerizable compound represented by formula (B) to 99.7% of a liquid crystal composition LC-1 to be uniformly dissolved.

[Chem. 24]

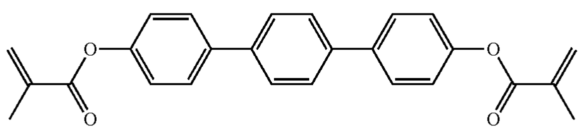

(B)

The CLC-B was injected to a cell with ITO with which a polyimide alignment film in which homeotropic alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 mW/cm$^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.6°, whereas the pretilt angle after irradiation was 87.4°, and the pretilt angle was fixed in a state of a liquid crystal molecule being inclined in the vertical direction. The content of the compound which is represented by general formula (B) and contained in the liquid crystal display element was analyzed with liquid chromatograph analysis, but the content thereof was less than or equal to the detection limit. However, it was revealed that the polymerizable compound represented by formula (B) had poor compatibility with another liquid crystal compound because when the CLC-B was stored in a cold place (−20° C.) for 2 weeks, deposition occurred.

Example 2

A polymerizable liquid crystal composition CLC-2 was prepared by adding 0.5% of the polymerizable compound represented by formula (I-2) to 99.5% of a liquid crystal composition LC-1 to be uniformly dissolved. The CLC-2 was injected to a cell with ITO with which a polyimide alignment film in which homeotropic alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 mW/cm$^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.6°, whereas the pretilt angle after irradiation was 86.8°, and the pretilt angle was fixed in a state of a liquid crystal molecule being inclined in the vertical direction. The content of the compound which is represented by general formula (I-2) and contained in the liquid crystal display element was analyzed with liquid chromatograph analysis, but the content thereof was less than or equal to the detection limit. Due to this, it was confirmed that the polymerizable compound represented by general formula (I-2) was able to be polymerized without using a polymerization initiator and the amount of a non-polymerized product remained after the polymerization was less than or equal to the detection limit.

Example 3

A polymerizable liquid crystal composition CLC-3 was prepared by adding 0.3% of the polymerizable compound represented by formula (I-1) to 99.7% of a liquid crystal composition LC-1 to be uniformly dissolved.

[Chem. 25]

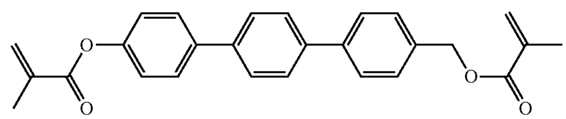

(I-1)

It was revealed that the polymerizable compound represented by formula (I-1) did not degrade the liquid crystal properties of the liquid crystal composition to be added. Further, it was revealed that the polymerizable compound represented by formula (I-1) had excellent compatibility with another liquid crystal compound because the CLC-3 was stored in a cold place (−20° C.) for 4 weeks and deposition or the like did not occur. The CLC-3 was injected to a cell with ITO with which a polyimide alignment film in which homeotropic alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 mW/cm$^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.8°, whereas the pretilt angle after irradiation was 87.3°, and the pretilt angle was fixed in a state of a liquid crystal molecule being inclined in the vertical direction. The content of the compound which is represented by general formula (I-1) and contained in the liquid crystal display element was analyzed with liquid chromatograph analysis, but the content thereof was less than or equal to the detection limit. Due to this, it was confirmed that the polymerizable compound represented by general formula (I-1) was able to be polymerized without using a polymerization initiator and the amount of a non-polymerized product remained after the polymerization was less than or equal to the detection limit.

Example 4

A polymerizable liquid crystal composition CLC-4 was prepared by adding 0.3% of the polymerizable compound represented by formula (I-3) to 99.7% of a liquid crystal composition LC-1 to be uniformly dissolved.

[Chem. 26]

(I-3)

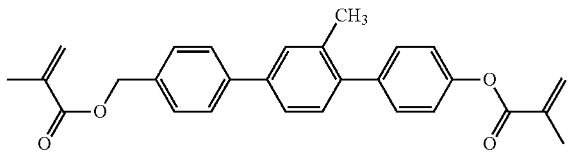

It was revealed that the polymerizable compound represented by formula (I-3) did not degrade the liquid crystal properties of the liquid crystal composition to be added. Further, it was revealed that the polymerizable compound represented by formula (I-3) had excellent compatibility with another liquid crystal compound because the CLC-4 was stored in a cold place (−20° C.) for 4 weeks and deposition or the like did not occur. The CLC-4 was injected to a cell with ITO with which a polyimide alignment film in which homeotropic alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 $mW/cm^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.7°, whereas the pretilt angle after irradiation was 87.1°, and the pretilt angle was fixed in a state of a liquid crystal molecule being inclined in the vertical direction. The content of the compound which is represented by general formula (I-3) and contained in the liquid crystal display element was analyzed with liquid chromatograph analysis, but the content thereof was less than or equal to the detection limit. Due to this, it was confirmed that the polymerizable compound represented by general formula (I-3) was able to be polymerized without using a polymerization initiator and the amount of a non-polymerized product remained after the polymerization was less than or equal to the detection limit.

Example 5

A polymerizable liquid crystal composition CLC-5 was prepared by adding 0.3% of the polymerizable compound represented by formula (I-21) to 99.7% of a liquid crystal composition LC-1 to be uniformly dissolved.

[Chem. 27]

(I-21)

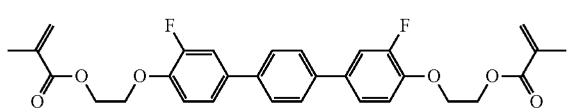

It was revealed that the polymerizable compound represented by formula (I-21) did not degrade the liquid crystal properties of the liquid crystal composition to be added. Further, it was revealed that the polymerizable compound represented by formula (I-21) had excellent compatibility with another liquid crystal compound because the CLC-5 was stored in a cold place (−20° C.) for 4 weeks and deposition or the like did not occur. The CLC-5 was injected to a cell with ITO with which a polyimide alignment film in which homeotropic alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 $mW/cm^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.5°, whereas the pretilt angle after irradiation was 87.8°, and the pretilt angle was fixed in a state of a liquid crystal molecule being inclined in the vertical direction. The content of the compound which is represented by general formula (I-21) and contained in the liquid crystal display element was analyzed with liquid chromatograph analysis, but the content thereof was less than or equal to the detection limit. Due to this, it was confirmed that the polymerizable compound represented by general formula (I-21) was able to be polymerized without using a polymerization initiator and the amount of a non-polymerized product remained after the polymerization was less than or equal to the detection limit.

Example 6

A polymerizable liquid crystal composition CLC-6 was prepared by adding 0.3% of the polymerizable compound represented by formula (I-26) to 99.7% of a liquid crystal composition LC-1 to be uniformly dissolved.

[Chem. 28]

(I-26)

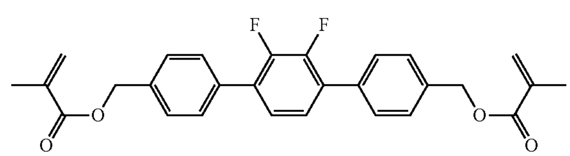

It was revealed that the polymerizable compound represented by formula (I-26) did not degrade the liquid crystal properties of the liquid crystal composition to be added. Further, it was revealed that the polymerizable compound represented by formula (I-26) had excellent compatibility with another liquid crystal compound because the CLC-6 was stored in a cold place (−20° C.) for 4 weeks and deposition or the like did not occur. The CLC-6 was injected to a cell with ITO with which a polyimide alignment film in which homeotropic alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 mW/cm$^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.4°, whereas the pretilt angle after irradiation was 87.6°, and the pretilt angle was fixed in a state of a liquid crystal molecule being inclined in the vertical direction. The content of the compound which is represented by general formula (I-26) and contained in the liquid crystal display element was analyzed with liquid chromatograph analysis, but the content thereof was less than or equal to the detection limit. Due to this, it was confirmed that the polymerizable compound represented by general formula (I-26) was able to be polymerized without using a polymerization initiator and the amount of a non-polymerized product remained after the polymerization was less than or equal to the detection limit.

Example 7

A polymerizable liquid crystal composition CLC-7 was prepared by adding 0.1% of the polymerizable compound represented by formula (I-26) to 99.9% of a liquid crystal composition LC-1 to be uniformly dissolved. The CLC-7 was injected to a cell with ITO with which a polyimide alignment film in which homeotropic alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 mW/cm$^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.8°, whereas the pretilt angle after irradiation was 87.8°, and the pretilt angle was fixed in a state of a liquid crystal molecule being inclined in the vertical direction. The content of the compound which is represented by general formula (I-26) and contained in the liquid crystal display element was analyzed with liquid chromatograph analysis, but the content thereof was less than or equal to the detection limit. Due to this, it was confirmed that the polymerizable compound represented by general formula (I-26) was able to be polymerized without using a polymerization initiator and the amount of a non-polymerized product remained after the polymerization was less than or equal to the detection limit.

Example 8

A liquid crystal composition LC-2 having the following constituents was prepared as an example containing a compound selected from general formula (II), a compound selected from general formulae (IIIa), (IIIb), and (IIIc), or a compound selected from general formulae (IVa), (IVb), and (IVc).

[Chem. 29]

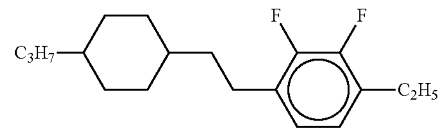

10%

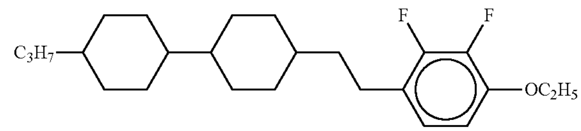

10%

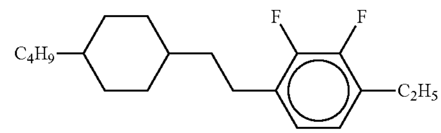

10%

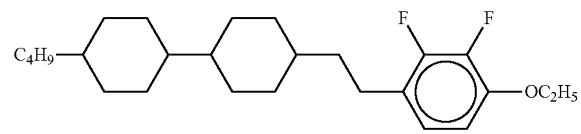

10%

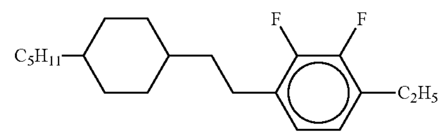

10%

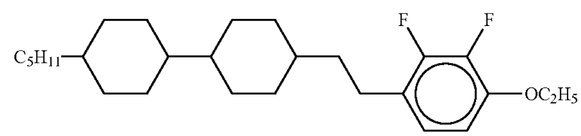

10%

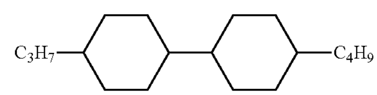

10%

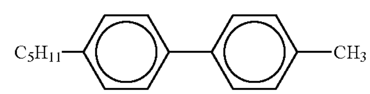

10%

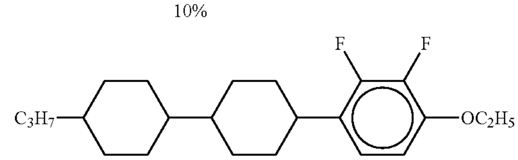

10%

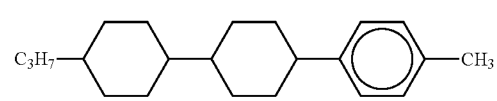

10%

The physical properties of the liquid crystal composition LC-2 are listed in Table 3.

TABLE 3

| | |
|---|---|
| $T_{N-I}$ (° C.) | 84.9 |
| Δε | −3.4 |
| Δn | 0.093 |

A polymerizable liquid crystal composition CLC-8 was prepared by adding 0.3% of the polymerizable compound represented by formula (I-2) to 99.7% of a liquid crystal composition LC-2 to be uniformly dissolved. It was revealed that the polymerizable compound represented by formula (I-2) did not degrade the liquid crystal properties of the liquid crystal composition to be added. Further, it was revealed that the polymerizable compound represented by formula (I-2) had excellent compatibility with another liquid crystal compound because the CLC-8 was stored in a cold place (−20° C.) for 4 weeks and deposition or the like did not occur. The CLC-8 was injected to a cell with ITO with which a polyimide alignment film in which homeotropic alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 $mW/cm^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.2°, whereas the pretilt angle after irradiation was 87.6°, and the pretilt angle was fixed in a state of a liquid crystal molecule being inclined in the vertical direction. The content of the compound which is represented by general formula (I-2) and contained in the liquid crystal display element was analyzed with liquid chromatograph analysis, but the content thereof was less than or equal to the detection limit. Due to this, it was confirmed that the polymerizable compound represented by formula (I-2) was able to be polymerized without using a polymerization initiator and the amount of a non-polymerized product remained after the polymerization was less than or equal to the detection limit.

Example 9

A liquid crystal composition LC-3 having the following constituents was prepared as an example containing a compound selected from general formula (II), a compound selected from general formulae (IIIa), (IIIb), and (IIIc), or a compound selected from general formulae (IVa), (IVb), and (IVc).

[Chem. 30]

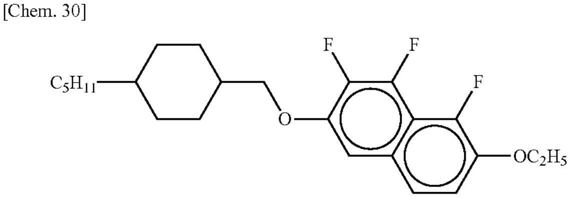

10%

-continued

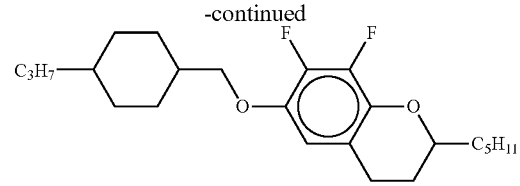

10%

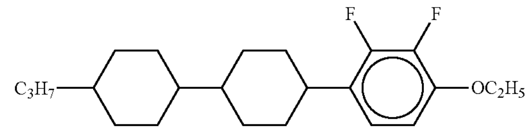

10%

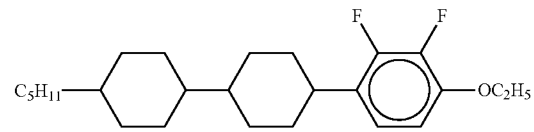

15%

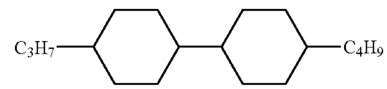

15%

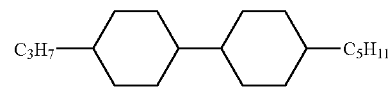

15%

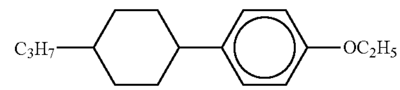

5%

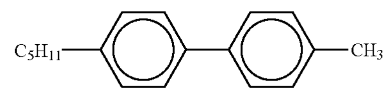

10%

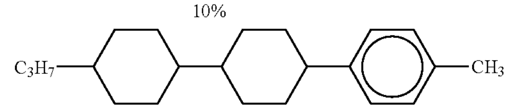

10%

The physical properties of the liquid crystal composition LC-3 are listed in Table 4.

TABLE 4

| | |
|---|---|
| $T_{N-I}$ (° C.) | 72.0 |
| Δε | −3.3 |
| Δn | 0.085 |

A polymerizable liquid crystal composition CLC-9 was prepared by adding 0.3% of the polymerizable compound represented by formula (I-2) to 99.7% of a liquid crystal composition LC-3 to be uniformly dissolved. It was revealed that the polymerizable compound represented by formula (I-2) did not degrade the liquid crystal properties of the liquid crystal composition to be added. Further, it was revealed that the polymerizable compound represented by formula (I-2) had excellent compatibility with another liquid crystal compound because the CLC-9 was stored in a cold place (−20° C.) for 4 weeks and deposition or the like did not occur. The CLC-9 was injected to a cell with ITO with which a polyimide alignment film in which homeotropic alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 $mW/cm^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.6°, whereas the pretilt angle after irradiation was 87.0°, and the pretilt angle was fixed in a state of a liquid crystal molecule being inclined in the vertical direction. The content of the compound which is represented by formula (I-2) and contained in the liquid crystal display element was analyzed with liquid chromatograph analysis, but the content thereof was less than or equal to the detection limit. Due to this, it was confirmed that the polymerizable compound represented by formula (I-2) was able to be polymerized without using a polymerization initiator and the amount of a non-polymerized product remained after the polymerization was less than or equal to the detection limit.

Example 10

A liquid crystal composition LC-4 having the following constituents was prepared as an example containing a compound selected from general formula (II), a compound selected from general formulae (IIIa), (IIIb), and (IIIc), or a compound selected from general formulae (IVa), (IVb), and (IVc).

[Chem. 31]

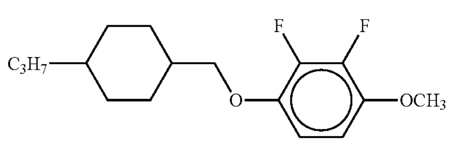

6%

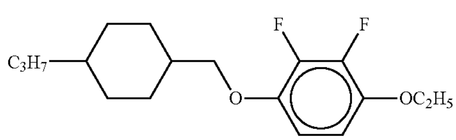

8%

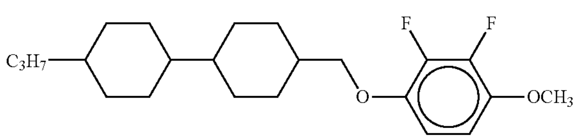

6%

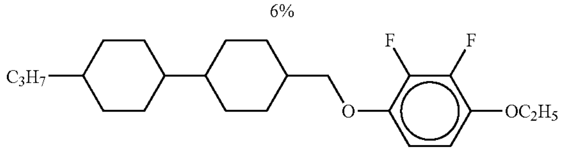

8%

-continued

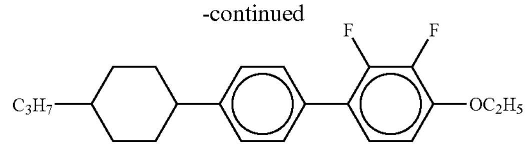

7%

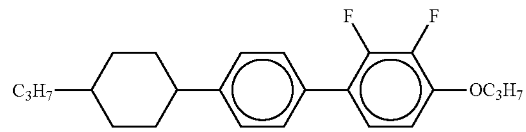

6%

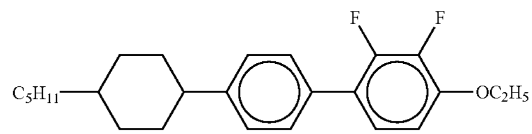

6%

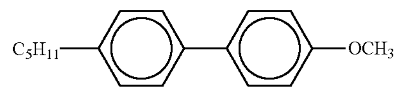

3%

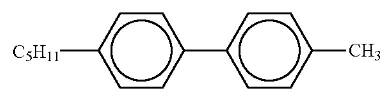

15%

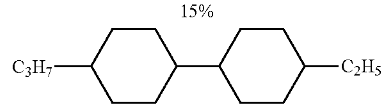

13%

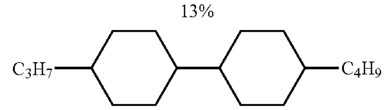

8%

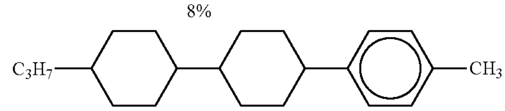

8%

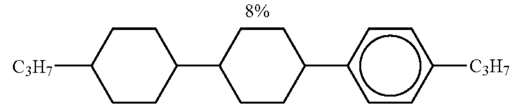

6%

The physical properties of the liquid crystal composition LC-4 are listed in Table 5.

TABLE 5

| | |
|---|---|
| $T_{N-I}$ (° C.) | 75.5 |
| Δε | −3.0 |
| Δn | 0.107 |

A polymerizable liquid crystal composition CLC-10 was prepared by adding 0.3% of the polymerizable compound represented by formula (I-2) to 99.7% of a liquid crystal composition LC-4 to be uniformly dissolved. It was revealed that the polymerizable compound represented by formula (I-2) did not degrade the liquid crystal properties of the liquid crystal composition to be added. Further, it was revealed that the polymerizable compound represented by formula (I-2) had excellent compatibility with another liquid crystal compound because the CLC-10 was stored in a cold place (−20° C.) for 4 weeks and deposition or the like did not occur. The CLC-10 was injected to a cell with ITO with which a polyimide alignment film in which homeotropic alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 $mW/cm^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 89.8°, whereas the pretilt angle after irradiation was 87.2°, and the pretilt angle was fixed in a state of a liquid crystal molecule being inclined in the vertical direction. The content of the compound which is represented by formula (I-2) and contained in the liquid crystal display element was analyzed with liquid chromatograph analysis, but the content thereof was less than or equal to the detection limit. Due to this, it was confirmed that the polymerizable compound represented by formula (I-2) was able to be polymerized without using a polymerization initiator and the amount of a non-polymerized product remained after the polymerization was less than or equal to the detection limit.

Example 11

A liquid crystal composition LC-5 having the following constituents was prepared as an example containing a compound selected from general formula (II), a compound selected from general formulae (IIIa), (IIIb), and (IIIc), and a compound selected from general formulae (IVa), (IVb), and (IVc).

[Chem. 32]

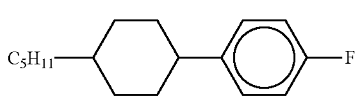

3%

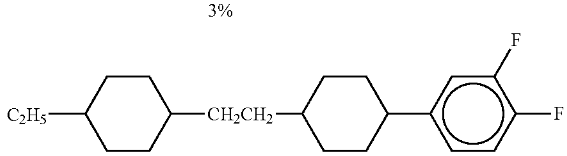

5%

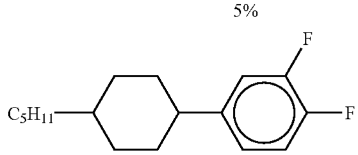

7%

-continued

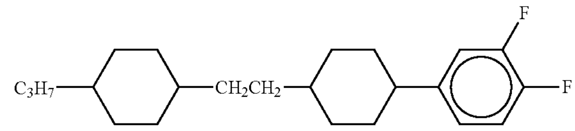

3%

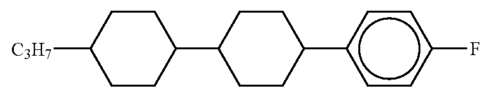

2%

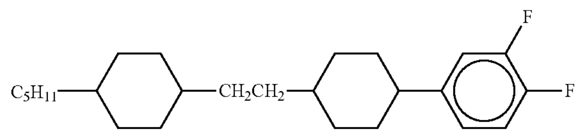

4%

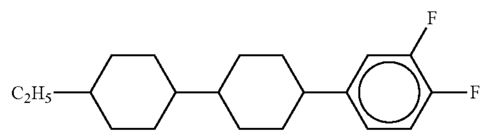

7.5%

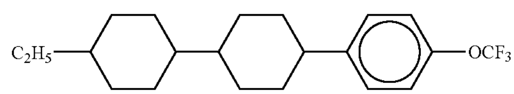

4%

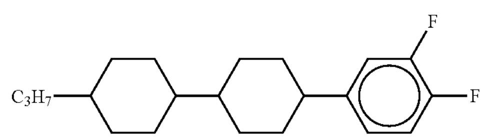

7.5%

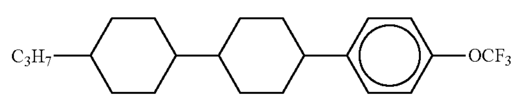

4%

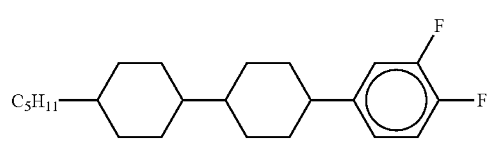

7.5%

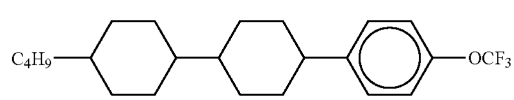

4%

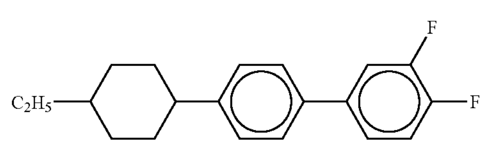

4%

-continued

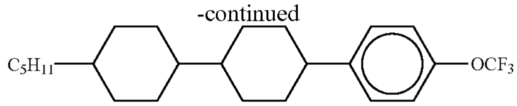

4%

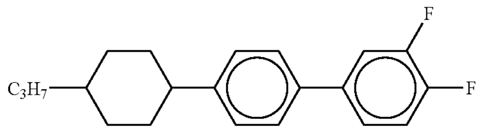

4%

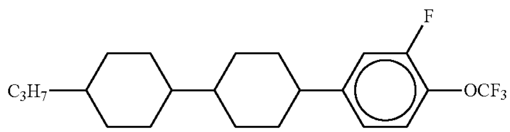

5%

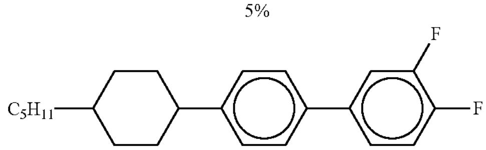

3%

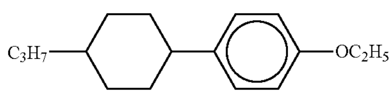

3%

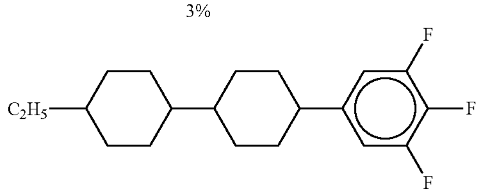

5%

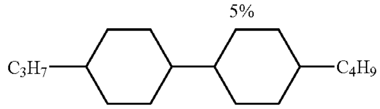

3%

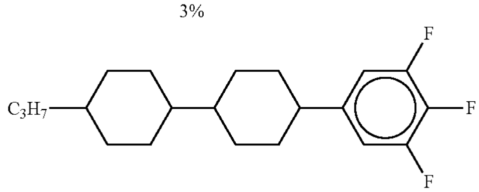

5%

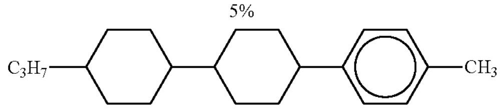

3%

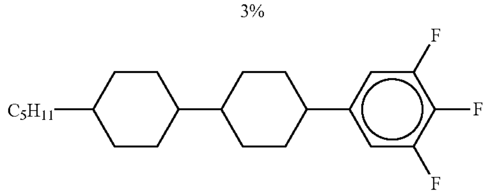

3.5%

The physical properties of the liquid crystal composition LC-5 are listed in Table 6.

TABLE 6

| | |
|---|---|
| $T_{N-I}$ (° C.) | 85.0 |
| Δε | 5.4 |
| Δn | 0.091 |

A polymerizable liquid crystal composition CLC-11 was prepared by adding 0.3% of the polymerizable compound represented by formula (I-2) to 99.7% of a liquid crystal composition LC-5 to be uniformly dissolved. It was revealed that the polymerizable compound represented by formula (I-2) did not degrade the liquid crystal properties of the liquid crystal composition to be added. Further, it was revealed that the polymerizable compound represented by formula (I-2) had excellent compatibility with another liquid crystal compound because the CLC-11 was stored in a cold place (−20° C.) for 4 weeks and deposition or the like did not occur. The CLC-11 was injected to a cell with ITO with which a polyimide alignment film in which parallel alignment was induced was coated with a cell gap of 3.5 μm using a vacuum injection method. The pretilt angle of the cell was measured and then the liquid crystal cell was irradiated with ultraviolet rays using a high-pressure mercury lamp via a filter cutting ultraviolet ray having a wavelength of 320 nm or less while a rectangular wave at 1.8 V with a frequency of 1 kHz was applied. Ultraviolet rays were irradiated for 600 seconds by adjusting the irradiation intensity such that the irradiation intensity on the surface of the cell became 10 $mW/cm^2$, thereby obtaining a vertical alignment liquid crystal display element allowing the polymerizable compound in the polymerizable liquid crystal composition to be polymerized. The pretilt angle before the irradiation with ultraviolet rays on the liquid crystal display element was 0.1°, whereas the pretilt angle after irradiation was 3.2°, the pretilt was formed, and the pretilt angle was fixed in a state of a liquid crystal molecule being inclined in the horizontal direction. The content of the compound which is represented by formula (I-2) and contained in the liquid crystal display element was analyzed with liquid chromatograph analysis, but the content thereof was less than or equal to the detection limit. Due to this, it was confirmed that the polymerizable compound represented by formula (I-2) was able to be polymerized without using a polymerization initiator and the amount of a non-polymerized product remained after the polymerization was less than or equal to the detection limit.

The invention claimed is:

1. A polymerizable-compound-containing liquid crystal composition, comprising:

a first component consisting of one or two or more kinds of polymerizable compounds represented by general formula (I) in the range of 0.01% by mass to 2% by mass:

(I)

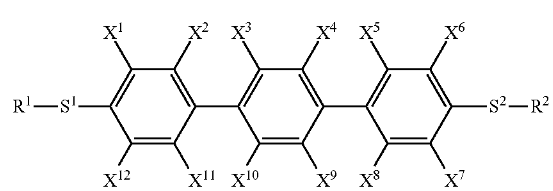

wherein $R^1$ and $R^2$ each independently represent any one of the following formulae (R-1) to (R-15), $S^1$ and $S^2$ each independently represent an alkylene group having 1 to 12 carbon atoms or a single bond, a methylene group in the alkylene group may be substituted with an oxygen atom, a sulfur atom, —CO—, —COO—, —OCO—, —OCOO—, or —CH═CH— as long as oxygen atoms are not directly bonded to each other, provided that at least one of $S^1$ and $S^2$ is not a single bond, and $X^1$ to $X^{12}$ each independently represent a hydrogen atom, a trifluoromethyl group, a trifluoromethoxy group, a methyl group, a chlorine atom, or a fluorine atom, (R-1)

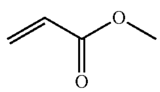

(R-2)

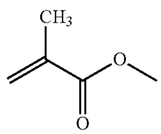

(R-3)

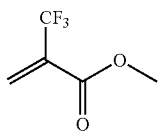

(R-4)

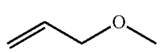

(R-5)

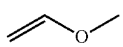

(R-6)

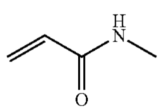

(R-7)

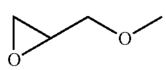

(R-8)

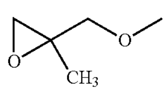

(R-9)

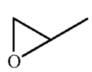

(R-10)

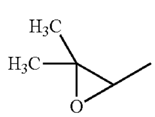

(R-11)

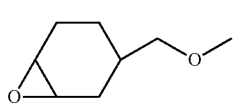

(R-12)

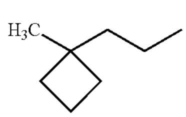

(R-13)

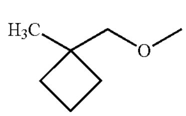

-continued (R-14)

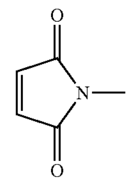

(R-15)

as a second component in the range of 5% by mass to 80% by mass, one or two or more kinds of compounds represented by general formula (II):

$$R^{21}\text{-}M^{21}\text{-}L^{21}\text{-}M^{22}\text{-}(L^{22}\text{-}M^{23})_o\text{-}R^{22} \quad \text{(II)}$$

wherein $R^{21}$ and $R^{22}$ each independently represent an alkyl group having 1 to 10 carbon atoms or an alkenyl group having 2 to 10 carbon atoms, one methylene group or two or more non-adjacent methylene groups present in these groups may be substituted with —O— or —S—, and one or two or more hydrogen atoms present in these groups may be substituted with a fluorine atom or a chlorine atom, $M^{21}$, $M^{22}$, $M^{23}$ each independently represent a group selected from the group consisting of (a) a trans-1,4-cyclohexylene group one methylene group or two or more non-adjacent methylene groups present in the group may be substituted with —O— or —S—, (b) a 1,4-phenylene group one —CH═ or two or more non-adjacent (—CH═)'s present in the group may be substituted with a nitrogen atom, a 3-fluoro-1,4-phenylene group, a 3,5-difluoro-1,4-phenylene group, and (c) a 1,4-cyclohexenylene group, a 1,4-bicyclo[2,2,2]octylene group, a piperidine-2,5-diyl group, a naphthalene-2,6-diyl group, a decahydronaphthalene-2,6-diyl group, and a 1,2,3,4-tetrahydronaphthalene-2,6-diyl group, o represents 0, 1, or 2, and $L^{21}$ and $L^{22}$ each independently represent a single bond, —$CH_2CH_2$—, —$(CH_2)_4$—, —$OCH_2$—, —$CH_2O$—, —$OCF_2$—, —$CF_2O$—, —CH═CH—, —CH═N—N═CH—, or —C≡C—, and when a plurality of $L^{22}$'s and/or $M^{23}$'s are present, they may be the same as or different from each other, as a third component, one or two or more kinds of a compound selected from the group consisting of compounds represented by general formulae (IVa), (IVb), and (IVc):

(IVa)

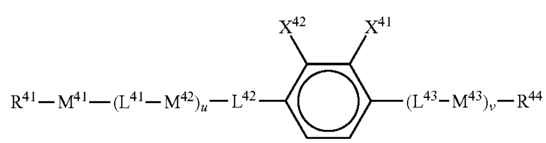

(IVb)

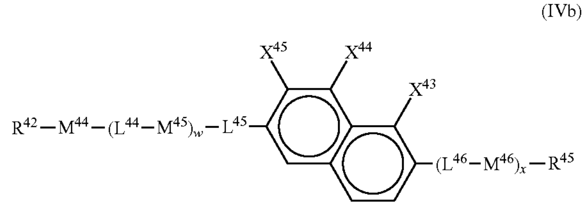

-continued (IVc)

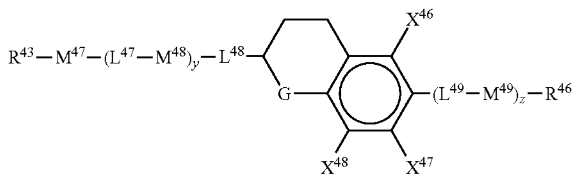

wherein $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, and one methylene group or two or more non-adjacent methylene groups present in these groups may be substituted with —O— or —S—, and one or two or more of hydrogen atoms present in these groups may be substituted with a fluorine atom or a chloride atom, $M^{41}$, $M^{42}$, $M^{43}$, $M^{44}$, $M^{45}$, $M^{46}$, $M^{47}$, $M^{48}$, and $M^{49}$ each independently represent a group selected from the group consisting of (d) a trans-1,4-cyclohexylene group (one methylene group or two or more non-adjacent methylene groups present in the group may be substituted with —O— or —S—), (e) a 1,4-phenylene group one —CH═ or two or more non-adjacent (—CH═)'s present in the group may be substituted with a nitrogen atom, and (f) a 1,4-cyclohexenylene group, a 1,4-bicyclo[2,2,2]octylene group, a piperidine-2,5-diyl group, a naphthalene-2,6-diyl group, a 1,2,3,4-tetrahydronaphthalene-2,6-diyl group, and a decahydronaphthalene-2,6-diyl group, and a hydrogen atom contained in the groups (d), (e), and (f) may be substituted with a cyano group, a fluorine atom, a trifluoromethyl group, a trifluoromethoxy group, or a chlorine atom, $L^{41}$, $L^{42}$, $L^{43}$, $L^{44}$, $L^{45}$, $L^{46}$, $L^{47}$, $L^{48}$ and $L^{49}$ each independently represent a single bond, —COO—, —OCO—, —$CH_2CH_2$—, —$(CH_2)_4$—, —$OCH_2$—, —$CH_2O$—, —$OCF_2$—, —$CF_2O$—, or —C≡C—, and when a plurality of $M^{42}$, $M^{43}$, $M^{45}$, $M^{46}$, $M^{48}$, $M^{49}$, $L^{41}$, $L^{43}$, $L^{44}$, $L^{46}$, $L^{47}$, and/or $L^{49}$ are present, they may be the same as or different from each other, $X^{43}$, $X^{44}$, $X^{45}$, $X^{46}$, $X^{47}$, and $X^{48}$ each independently represent a hydrogen atom, a trifluoromethyl group, a trifluoromethoxy group, or a fluorine atom, $X^{41}$ and $X^{42}$ represents a fluorine atom, any one of $X^{43}$, $X^{44}$, and $X^{45}$ represents a fluorine atom, any one of $X^{46}$, $X^{47}$, and $X^{48}$ represents a fluorine atom, provided that $X^{46}$ and $X^{47}$ do not represent a fluorine atom and $X^{46}$ and $X^{48}$ do not represent a fluorine atom at the same time, G represents a methylene group or —O—, and u, v, w, x, y, and z each independently represent 0, 1, or 2, and u+v, w+x, and y+z are each 2 or less, and one or two or more kinds of a compound selected from the group consisting of compounds represented by general formulae (II-E) and (IVa-1):

(II-E)

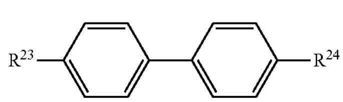

in the formula, $R^{23}$ and $R^{24}$ each independently represent an alkyl group having 1 to 10 carbon atoms, an alkoxy group having 1 to 10 carbon atoms, an alkenyl group having 2 to 10 carbon atoms, or an alkenyloxy group having 3 to 10 carbon atoms, (IVa-1)

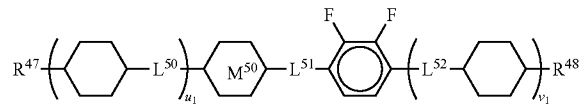

in the formula, $R^{47}$ and $R^{48}$ each independently represent an alkyl group having 1 to 8 carbon atoms, an alkoxyl group having 1 to 8 carbon atoms, or an alkenyl group having 2 to 8 carbon atoms, $L^{50}$, $L^{51}$, and $L^{52}$ each independently represent a single bond, $M^{50}$ represents a 1,4-phenylene group, and $u_1$ and $v_1$ each independently represent 0.

2. The polymerizable-compound-containing liquid crystal composition according to claim 1, wherein the liquid crystal composition contains as the first component, one or two or more kinds of compounds in which at least one of $X^1$ to $X^{12}$ in general formula (I) is a trifluoromethyl group, a trifluoromethoxy group, a methyl group, a chlorine atom, or a fluorine atom.

3. The polymerizable-compound-containing liquid crystal composition according to claim 1, wherein the liquid crystal composition contains as the first component, one or two or more kinds of compounds in which at least one of $X^1$ to $X^{12}$ in general formula (I) is a methyl group or a fluorine atom.

4. The polymerizable-compound-containing liquid crystal composition according to claim 1, wherein the liquid crystal composition contains as the first component, one or two or more kinds of compounds in which $X^1$, $X^6$, $X^7$, and $X^{12}$ in general formula (I) are hydrogen atoms.

5. The polymerizable-compound-containing liquid crystal composition according to claim 1, wherein the liquid crystal composition contains as the first component, one or two or more kinds of polymerizable compounds selected from polymerizable compounds represented by general formulae (I-2), (I-3), (I-21), (I-26), and (I-36):

(I-2)

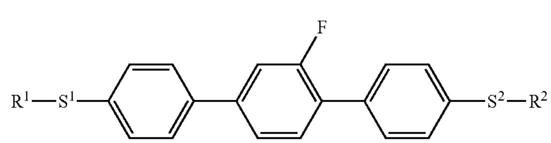

(I-3)

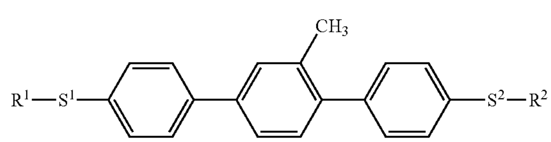

(I-21)

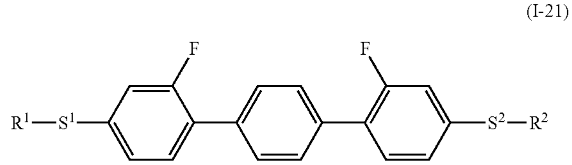

-continued (I-26)

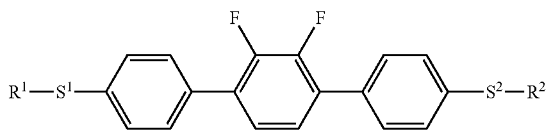

(I-36)

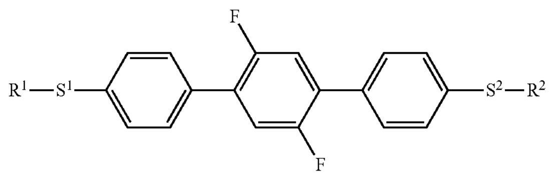

wherein $S^1$ and $S^2$ each independently represent an alkylene group having 1 to 12 carbon atoms or a single bond, a methylene group in the alkylene group may be substituted with an oxygen atom, a sulfur atom, —CO—, —COO—, —OCO—, —OCOO— or —CH═CH— as long as oxygen atoms are not directly bonded to each other, provided that at least one of $S^1$ and $S^2$ represents a spacer group, $R^1$ represents the same definition as $R^1$ according to claim 1, and $R^2$ represents the same definition as $R^2$ according to claim 1.

6. The polymerizable-compound-containing liquid crystal composition according to claim 1, wherein a dielectric anisotropy of the polymerizable-compound-containing liquid crystal composition is positive.

7. The polymerizable-compound-containing liquid crystal composition according to claim 1, wherein a dielectric anisotropy of the polymerizable-compound-containing liquid crystal composition is negative.

8. The polymerizable-compound-containing liquid crystal composition according to claim 1, wherein the liquid crystal composition contains the second component in the range of 5% by mass to 70% by mass.

9. The polymerizable-compound-containing liquid crystal composition according to claim 1, wherein the liquid crystal composition contains the third component in the range of 5% by mass to 70% by mass.

10. The polymerizable-compound-containing liquid crystal composition according to claim 1, wherein the liquid crystal composition is used for a liquid crystal display element that has a pair of substrates, a liquid crystal interposed between the substrates, a transparent electrode, and a polarizer, in which a liquid crystal alignment capability is provided by polymerizing a polymerizable compound contained in the liquid crystal composition.

11. A liquid crystal display element using the polymerizable-compound-containing liquid crystal composition according to claim 1 and comprising a pair of substrates, a liquid crystal interposed between the substrates, a transparent electrode, and a polarizer, wherein a liquid crystal alignment capability is provided by polymerizing a polymerizable compound contained in the liquid crystal composition.

12. The polymerizable-compound-containing liquid crystal composition according to claim 1, comprising the compound represented by the general formula (IVa), wherein u is 0, v is 0, $M^{41}$ is a 1,4-phenylene group, and $L^{42}$ is a single bond.

* * * * *